United States Patent
Raman et al.

(10) Patent No.: US 8,946,333 B2
(45) Date of Patent: *Feb. 3, 2015

(54) THERMALLY CONDUCTIVE PLASTIC COMPOSITIONS, EXTRUSION APPARATUS AND METHODS FOR MAKING THERMALLY CONDUCTIVE PLASTICS

(71) Applicant: Momentive Performance Materials Inc., Waterford, NY (US)

(72) Inventors: Chandrashekar Raman, North Royalton, OH (US); Bei Xiang, Strongsville, OH (US); Anand Murugaiah, Strongsville, OH (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/829,225

(22) Filed: Mar. 14, 2013

(65) Prior Publication Data

US 2014/0080952 A1   Mar. 20, 2014

Related U.S. Application Data

(60) Provisional application No. 61/702,787, filed on Sep. 19, 2012.

(51) Int. Cl.
| | |
|---|---|
| C08K 3/38 | (2006.01) |
| C08K 3/20 | (2006.01) |
| B32B 19/04 | (2006.01) |
| C08K 5/5425 | (2006.01) |
| C08K 5/54 | (2006.01) |
| C08K 3/22 | (2006.01) |
| C08K 13/02 | (2006.01) |
| B29C 47/64 | (2006.01) |
| C08J 3/20 | (2006.01) |
| B29B 7/42 | (2006.01) |
| B29B 7/48 | (2006.01) |
| B29C 47/38 | (2006.01) |
| B29C 47/60 | (2006.01) |
| B29C 47/00 | (2006.01) |
| B29B 7/84 | (2006.01) |
| B29B 7/90 | (2006.01) |

(52) U.S. Cl.
CPC ............ C08K 3/38 (2013.01); C08K 5/5425 (2013.01); C08K 5/5403 (2013.01); C08K 3/22 (2013.01); C08K 5/54 (2013.01); C08K 13/02 (2013.01); B29C 47/64 (2013.01); C08J 3/203 (2013.01); B29B 7/421 (2013.01); B29B 7/482 (2013.01); B29C 47/385 (2013.01); B29C 47/6031 (2013.01); B29C 47/605 (2013.01); B29C 47/0009 (2013.01); C08K 2003/385 (2013.01); C08K 2201/001 (2013.01); B29B 7/845 (2013.01); B29B 7/90 (2013.01)
USPC ........... 524/404; 524/424; 524/428; 524/430; 524/440; 524/606; 428/403; 428/405; 428/406

(58) Field of Classification Search
None
See application file for complete search history.

(56) References Cited

U.S. PATENT DOCUMENTS

| | | |
|---|---|---|
| 3,608,868 A | 9/1971 | Koch |
| 4,826,896 A | 5/1989 | Procter |
| 5,110,861 A | 5/1992 | Togami et al. |
| 5,232,970 A | 8/1993 | Solc et al. |
| 5,530,050 A | 6/1996 | Rangaswamy |
| 5,898,009 A | 4/1999 | Shaffer et al. |
| 5,900,447 A | 5/1999 | Ishida |
| 6,048,511 A | 4/2000 | Shaffer et al. |
| 6,069,201 A | 5/2000 | Okinoshima et al. |
| 6,127,468 A | 10/2000 | Cruse et al. |
| 6,162,849 A | 12/2000 | Zhuo et al. |
| 6,174,841 B1 | 1/2001 | Yamada et al. |
| 6,204,339 B1 | 3/2001 | Waldman et al. |
| 6,255,376 B1 | 7/2001 | Shikata et al. |
| 6,372,337 B2 | 4/2002 | Takahashi et al. |
| 6,414,061 B1 | 7/2002 | Cruse et al. |
| 6,528,673 B2 | 3/2003 | Cruse et al. |
| 6,608,125 B2 | 8/2003 | Cruse et al. |
| 6,635,700 B2 * | 10/2003 | Cruse et al. ................. 524/262 |
| 6,649,684 B1 * | 11/2003 | Okel ............................. 524/493 |
| 6,652,822 B2 | 11/2003 | Phillips et al. |
| 6,683,135 B2 | 1/2004 | Cruse et al. |

(Continued)

FOREIGN PATENT DOCUMENTS

| | | |
|---|---|---|
| CN | 102212273 | 10/2011 |
| CN | 102321364 | 1/2012 |

(Continued)

OTHER PUBLICATIONS

International Search Report and Written Opinion of the International Search Report, PCT/US2013/060617, Momentive Performance Materials, Inc., Jan. 30, 2014.
International Search Report and Written Opinion of the International Search Report, PCT/US2013/060637, Momentive Performance Materials, Inc., Dec. 2, 2013.
International Search Report and Written Opinion of the International Search Report, PCT/US2013/060633, Momentive Performance Materials, Inc., Dec. 10, 2013.
International Search Report and Written Opinion of the International Search Report, PCT/US2013/060548, Momentive Performance Materials, Inc., Dec. 10, 2013.

(Continued)

Primary Examiner — Marc Zimmer
(74) Attorney, Agent, or Firm — Joseph E. Waters, Esq.; McDonald Hopkins LLC

(57) ABSTRACT

A thermally conductive filler composition and a resin composition comprising such filler compositions. The filler composition comprises a blend of a boron nitride, a metal oxide, and a silane. The filler composition can further comprise other filler components including, for example, glass fiber or glass flake. The filler compositions can be added to a resin composition to provide a thermally conductive resin such as, for example, a thermally conductive plastic.

58 Claims, 3 Drawing Sheets

(56) References Cited

U.S. PATENT DOCUMENTS

| | | |
|---|---|---|
| 6,777,569 B1 | 8/2004 | Westmeyer et al. |
| 6,951,583 B2 | 10/2005 | Clere et al. |
| 7,074,876 B2 | 7/2006 | Cruse et al. |
| 7,078,551 B2 | 7/2006 | Cruse et al. |
| 7,081,500 B2 | 7/2006 | Cruse et al. |
| 7,122,590 B2 | 10/2006 | Cruse et al. |
| 7,301,042 B2 | 11/2007 | Cruse |
| 7,432,321 B2 | 10/2008 | Joshi et al. |
| 7,462,656 B2 | 12/2008 | Keulen et al. |
| 7,476,702 B2 | 1/2009 | Sagal et al. |
| 7,524,560 B2 | 4/2009 | Paisner et al. |
| 7,528,273 B2 | 5/2009 | Simandan et al. |
| 7,584,795 B2 * | 9/2009 | Hepburn et al. ............... 166/313 |
| 7,723,419 B1 | 5/2010 | Manian et al. |
| 7,897,083 B2 | 3/2011 | Fukatsu et al. |
| 7,969,027 B2 * | 6/2011 | Osada ............................ 257/789 |
| 8,003,216 B2 | 8/2011 | Wang et al. |
| 8,008,520 B2 | 8/2011 | Cruse et al. |
| 8,008,524 B2 | 8/2011 | Cruse et al. |
| 8,029,876 B2 | 10/2011 | Park et al. |
| 8,097,743 B2 | 1/2012 | Glatzer et al. |
| 8,211,341 B2 | 7/2012 | Lustiger |
| 8,299,159 B2 | 10/2012 | Chandrasekhar et al. |
| 8,324,326 B2 * | 12/2012 | Kotani et al. .................. 525/531 |
| 8,552,101 B2 * | 10/2013 | l'Abee et al. .................. 524/420 |
| 2001/0021740 A1 | 9/2001 | Lodyga et al. |
| 2002/0006373 A1 | 1/2002 | Clere |
| 2004/0068037 A1 | 4/2004 | Mitadera et al. |
| 2004/0208812 A1 | 10/2004 | Clere |
| 2004/0252502 A1 | 12/2004 | McCullough et al. |
| 2005/0041373 A1 | 2/2005 | Pruss et al. |
| 2005/0189523 A1 | 9/2005 | Sagal et al. |
| 2005/0250910 A1 | 11/2005 | Cheng et al. |
| 2006/0293427 A1 | 12/2006 | Martens et al. |
| 2007/0001292 A1 | 1/2007 | Ohta et al. |
| 2007/0026221 A1 | 2/2007 | Stevens et al. |
| 2007/0259993 A1 | 11/2007 | Yamaguchi |
| 2008/0153959 A1 | 6/2008 | Charati et al. |
| 2008/0153960 A1 | 6/2008 | Meneghetti et al. |
| 2008/0306213 A1 | 12/2008 | Jiang et al. |
| 2009/0023851 A1 | 1/2009 | Bierdel et al. |
| 2009/0043026 A1 | 2/2009 | Tanaka et al. |
| 2009/0226711 A1 | 9/2009 | Silvi et al. |
| 2010/0020559 A1 | 1/2010 | Janssen et al. |
| 2010/0048789 A1 * | 2/2010 | Shieh et al. .................... 524/404 |
| 2010/0060134 A1 | 3/2010 | Saito et al. |
| 2010/0063192 A1 | 3/2010 | Okubo et al. |
| 2010/0076120 A1 | 3/2010 | Emmerson et al. |
| 2010/0159213 A1 | 6/2010 | Przybylinski et al. |
| 2010/0200801 A1 | 8/2010 | Ramasamy et al. |
| 2010/0208429 A1 | 8/2010 | Zhang et al. |
| 2010/0226095 A1 * | 9/2010 | Mimura et al. ............... 361/707 |
| 2010/0242799 A1 | 9/2010 | Kim |
| 2010/0279091 A1 | 11/2010 | Nishida et al. |
| 2010/0305253 A1 | 12/2010 | Staal et al. |
| 2011/0045223 A1 | 2/2011 | Lin et al. |
| 2011/0063940 A1 | 3/2011 | Padmanabhan |
| 2011/0103021 A1 | 5/2011 | Janssen et al. |
| 2011/0165410 A1 | 7/2011 | Aoyagi et al. |
| 2011/0204282 A1 | 8/2011 | Yoshihara et al. |
| 2011/0279035 A1 | 11/2011 | Van Dijk et al. |
| 2011/0290468 A1 | 12/2011 | Nakayama et al. |
| 2012/0045953 A1 * | 2/2012 | Wang et al. ...................... 442/1 |
| 2012/0123054 A1 * | 5/2012 | Matsumoto et al. .......... 524/701 |
| 2012/0157600 A1 * | 6/2012 | Saga ............................. 524/496 |
| 2012/0217434 A1 | 8/2012 | l'Abee et al. |
| 2012/0319031 A1 | 12/2012 | Li et al. |
| 2013/0030105 A1 | 1/2013 | Shimokoba et al. |
| 2013/0099424 A1 | 4/2013 | Rohatgi et al. |
| 2013/0116371 A1 * | 5/2013 | Oktavia et al. ................ 524/404 |
| 2014/0077125 A1 | 3/2014 | Lin et al. |
| 2014/0080951 A1 | 3/2014 | Raman et al. |
| 2014/0080952 A1 | 3/2014 | Raman et al. |
| 2014/0080954 A1 | 3/2014 | Raman et al. |

FOREIGN PATENT DOCUMENTS

| | | |
|---|---|---|
| CN | 10254513 | 6/2012 |
| EP | 0297839 | 1/1989 |
| EP | 0302648 | 2/1989 |
| EP | 1816175 | 1/2007 |
| EP | 2348071 | 7/2011 |
| EP | 1601739 | 10/2011 |
| JP | 2009173855 | 8/2009 |
| KR | 20110124127 | 11/2011 |
| SU | 771138 | 10/1980 |
| WO | WO2008/006443 | 1/2008 |
| WO | WO2008/088774 | 7/2008 |
| WO | WO2009/035439 | 3/2009 |
| WO | 2010097466 | 9/2010 |
| WO | WO2010/097466 | 9/2010 |
| WO | 2011010290 | 1/2011 |
| WO | WO2011/010290 | 1/2011 |
| WO | WO2011/125545 | 10/2011 |
| WO | WO2012/093895 | 7/2012 |
| WO | WO2014/047249 | 3/2014 |
| WO | WO2014/047297 | 3/2014 |
| WO | WO2014/047298 | 3/2014 |
| WO | WO2014/055258 | 4/2014 |

OTHER PUBLICATIONS

Philips technology white paper, "Understanding power LED lifetime analysis" (2009).

T. B. Lewis and L. E. Nielsen, "Dynamic Mechanical Properties of Particulate-Filled Composites", Journal of Applied Polymer Science, vol. 14, pp. 1449-1471 (1970).

C. Heinle, "Thermal conductivity of polymers filled with non-isometric fillers: A process dependent, anisotropic property", Chicago, IL, USA (2009).

Shen et al. "Intercalation of Hexagonal Boron Nitride by Strong Oxidizers and Evidence for the Metallic Nature of the Products", Journal of Solid State Chemistry, v147, pp. 74-81 (1999).

Janssen, Douven, van Dijk (DSM), "Thermo-conductive (TC) plastics in LED lamps", IMAPS Device Packaging Conference, Phoenix, AZ (Mar. 2010).

Padmanabhan, Jayanth "Shear uniformity in co-rotating twin screw extruder—a geometrical study of shear rates in a fully filled zone", Society of Plastics Engineers Annual conference, ANTEC Proceedings (2009).

Raman, C. "Boron nitride in thermoplastics: Effect of loading, particle morphology and processing conditions." Proceedings of the NATAS Annual conference on Thermal Analysis and Applications, vol. 36 (2008).

* cited by examiner

THERMALLY CONDUCTIVE PLASTIC COMPOSITIONS, EXTRUSION APPARATUS AND METHODS FOR MAKING THERMALLY CONDUCTIVE PLASTICS

CROSS REFERENCE TO RELATED APPLICATIONS

This application claims the benefit of U.S. Provisional Patent Application No. 61/702,787 entitled "Thermally Conductive Plastic Composition, Extrusion Apparatus And Methods For Making Thermally Conductive Plastics" filed on Sep. 19, 2012 which is hereby incorporated in its entirety by reference.

FIELD

The present invention provides thermally conductive plastic compositions, extruder screw configurations, and a method for extruding thermally plastic compositions. The present invention provides compositions comprising a boron nitride filler material. The thermally conductive plastic compositions and articles formed therefrom can exhibit excellent thermal conductivity in both the in-plane and through plane directions.

BACKGROUND

Thermal management of various electronic and opto-electronic devices is increasingly gaining attention due to the severe challenges faced in such devices. The trend of shrinking sizes and increased functionality continues in personal hand-held electronic devices. The power density, and hence the density of heat that needs to be dissipated have significantly increased, which poses significant challenges to providing good thermal management in those devices. Similarly, in opto-electronic devices, also known as light emitting diodes (LEDs), the power consumption and lumen output is ever increasing. Thermal management problems are also widely prevalent in other applications such as electronic components in automobiles, rechargeable battery systems and power inverters for hybrid vehicles, etc. Insufficient or ineffective thermal management can have a strong and deleterious effect on the performance and long-term reliability of devices.

Currently LED-based bulbs are being used to replace older bulbs and are designed to fit into conventional "Edison" sockets. Fitting LED bulbs into Edison sockets only exacerbates the thermal management challenges since the heat dissipation is limited by natural convection. LED bulbs therefore require well-designed heat sinks to efficiently and adequately dissipate the waste heat. Inefficient thermal management leads to higher operating temperatures of the LEDs, which is indicated by the junction temperature ($T_j$) of the LED. The lifetime of an LED (defined as time taken to lose 30% light output i.e. reach B70) can potentially decrease from 80,000 hours to 20,000 hours when the junction temperature is increased from 115° C. to 135° C.

Aluminum heat sinks are a natural choice for LED applications based on similarities to heat sinks used for other electronic devices. However the use of aluminum heat sinks for LED bulbs presents several challenges. One challenge is electrically insulating the heat sink from the Edison socket. Any electrical connectivity or leak between a metal heat sink and the socket can be extremely dangerous during installation. Another challenge is providing heat sinks with complex shapes because die-casting heat fin shapes can be difficult and may require costly secondary machining operations. Aluminum heat sinks can also be quite heavy and can add significantly to the weight, and hence cost of transportation, of the bulb. Finally, aluminum heat sinks will need a finish step of painting to smooth surface finish and impart colors desired by the consumers.

Plastics can be an attractive alternative to aluminum for heat sinks. Plastics are electrically insulating, more amenable to complex heat sink structures via injection molding, light in weight, and can be colored freely to meet aesthetic or branding requirements. Plastics also offer the possibility of integrating several parts, which can lead to a simpler overall assembly of the bulb. Plastics, however, have very poor thermal conductivity—generally only around 0.2 W/mK—which is nearly two orders of magnitude lower than that of typical die-cast aluminum alloys (which are around 200 W/mK). Therefore, plastics are generally not sufficient to meet thermal management challenges.

Fillers are often added to plastics to make unique composite materials. For example, reinforcing fillers like glass fibers are added to improve the mechanical properties of plastics. Similarly graphite, carbon black or other carbon forms, including even carbon nanotubes recently are added to plastics to make electrically conductive plastic-based materials. Graphite and metal powders are also used sometimes to enhance thermal conductivity, but this usually leads to increased electrical conductivity as well since these properties are usually concomitant. However, some ceramic materials such as silica, alumina, zinc oxide, magnesium oxide, aluminum nitride, boron nitride (hexagonal or cubic forms), etc. present the opportunity to make thermally conductive yet electrically insulating formulations with plastics since they are good thermal conductors and electrical insulators.

While boron nitride plastic composites have been proposed, boron nitride/plastic composites have several drawbacks. Boron nitride is a relatively expensive material that can cost from 5 to 40 times more than the plastic resins that it is compounded with and as compared to aluminum alloys. From a performance standpoint, the in-plane thermal conductivity of the boron nitride/plastic composite is only around 2-10 W/mK even at high loadings of boron nitride, e.g., above 25-60 wt. % (15-45 vol %). Boron nitride is also very inert and not easily wet by resins. This leads to imperfect interfaces and large thermal resistances between the filler and matrix, effectively lowering the thermal conductivity of the composite thus leading to higher BN loadings required to achieve the required thermal conductivity. The higher filler loadings drives up the cost of these composites significantly making it less cost competitive in thermal management applications. The poor interfaces between the filler and resin also results in poor physical properties of the composites. It therefore becomes imperative to address the problems of wetting to achieve high thermal conductivity and optimum physical properties.

It is important to note however that even though thermal conductivity of thermally conductive plastics is not as high as aluminum metal, it is sufficient for thermal management applications in LED bulbs, and other convection limited applications. The inherent anisotropy of boron nitride/plastics composites can also be an issue which may limit the applicability of boron nitride/plastic composites in some applications where the through-plane thermal conductivity is critical to the application.

SUMMARY

In one aspect, the present invention provides thermally conductive plastic compositions. The compositions comprise a polymer matrix and a thermally conductive filler. In one embodiment, the compositions have an in-plane thermal conductivity of about 5 W/mK or greater. In one embodiment, the composition has a through-plane thermal conductivity of about 1 W/mK or greater. In one embodiment, the composition has an in-plane thermal conductivity to through-plane conductivity ratio of about 3.5:1 or less.

In one embodiment, the thermally conductive filler is a boron nitride. In one embodiment, the boron nitride can be chosen from platelet boron nitride, agglomerates of boron nitride, or a combination thereof. In another embodiment, a combination of fillers is employed to provide a composition exhibiting excellent thermal conductivity. In still another embodiment, a composition comprises functionalization additives that provide increased thermal conductivity and allow for the concentration of thermally conductive fillers to be minimized.

In one embodiment, the present invention provides a filler composition comprising a blend of a boron nitride, a metal oxide, and a silane. In one embodiment, the filler composition is a blend of a boron nitride, a metal oxide, a silane, and glass fiber. In one embodiment, the metal oxide is zinc oxide, magnesium oxide, titanium dioxide, zirconium dioxide or a combination of two or more thereof.

In one aspect, the present invention provides a filler composition comprising a blend of a boron nitride; a metal oxide; and a silane.

In one embodiment, the boron nitride is present in the filler composition in an amount of from about 15 weight percent to about 75 weight percent; the metal oxide is present in an amount of from about 5 weight percent to about 80 weight percent; and the silane is present in an amount of from about 0.1 weight percent to about 6 weight percent. In one embodiment, the boron nitride is present in the filler composition in an amount of from about 25 weight percent to about 70 weight percent; the metal oxide is present in an amount of from about 15 weight percent to about 75 weight percent; and the silane is present in an amount of from about 0.5 weight percent to about 5 weight percent. In one embodiment, the boron nitride is present in the filler composition in an amount of from about 30 weight percent to about 70 weight percent; the metal oxide in is present an amount of from about 20 weight percent to about 50 weight percent; and the silane is present in an amount of from about 1 weight percent to about 3.5 weight percent.

In one embodiment, the boron nitride is chosen from boron nitride particles, boron nitride agglomerates, or a mixture thereof. In one embodiment, the boron nitride comprises platelets having a particle size of 0.3 microns to about 200 microns. In one embodiment, the boron nitride comprises boron nitride agglomerates having a mean particle size of from about 5 microns to about 500 microns. In one embodiment, the composition can comprise nano-scale boron nitride materials including, but not limited to, nanotubes or nanosheets.

In one embodiment, the metal oxide is chosen from zinc oxide, magnesium oxide, beryllium oxide, titanium dioxide, zirconium oxide, or a combination of two or more thereof.

In one embodiment, the silane is chosen from an alkacryloxy silane, a vinyl silane, a halo silane, a mercapto silane, a thiocarboxylate silane, a blocked mercapto silane, or a combination of two or more thereof. In one embodiment, the silane is chosen from 3-octanoylthio-1-propyltriethoxy silane; vinyl tris(2-methoxy-ethoxy)silane; gamma-methacryloxypropyltreimethoxy silane, or a combination of two or more thereof.

In one embodiment, the filler composition further comprises an additional filler component chosen from glass fibers, glass flake, clays, exfoliated clays, calcium carbonate, talc, mica, wollastonite, clays, exfoliated clays, silver, alumina, aluminum nitride, metal sulfides, e.b., zinc sulfide, graphite, metallic powders or flakes of aluminum, copper, bronze, or brass, or a combination of two or more thereof; fibers or whiskers of metals, ceramics, or carbon forms such as copper, aluminum, zinc oxide, titanium dioxide, carbon, graphite, or a combination of two or more thereof. In one embodiment, the filler composition further comprises one or more nano-scale filler such as carbon nanotubes, graphene, boron nitride nanotubes, boron nitride nanosheets, zinc oxide nanotubes, or a combination of two or more thereof. In one embodiment, the additional filler component is present in an amount of from about from about 0.1 weight percent to about 30 weight percent.

In one embodiment, the filler composition comprises glass fiber or glass flake in an amount of from about 2 weight percent to about 20 weight percent.

In one embodiment, the filler composition has a colored measured in the $L^*$, $a^*$, $b^*$ space with a D65 light source and a 2 degree or a 10 degree observer with an $L^*$ value of at least 85, an $a^*$ value between $-1.5$ to $1.5$; and a $b^*$ value between $-3.0$ and $3.0$. In one embodiment, the color of the filler is such that $L^*$ is greater than 90, $a^*$ is between $-1.3$ and $1.3$, and $b^*$ is between $-2.5$ and $2.5$. In one embodiment, the color of the filler is such that $L^*$ is greater than 92, $a^*$ is between $-1.0$ and $1.0$, and $b^*$ is between $-2.0$ and $2.0$.

In another aspect, the present invention provides a thermally conductive composition comprising a polymer material; and a thermally conductive filler composition dispersed in the polymer material, wherein the thermally conductive filler composition comprises a blend of a boron nitride, a metal oxide, and a silane, and the thermally conductive composition has an in-plane thermal conductivity of about 2 W/mK or greater, a through-plane thermal conductivity of about 0.9 W/mK or greater, or both.

In one embodiment, the thermally conductive composition has an in-plane thermal conductivity of 3.5 W/mK or greater. In one embodiment, the thermally conductive composition has an in-plane thermal conductivity of 5 W/mK or greater.

In one embodiment, the thermally conductive composition has a total thermally conductive filler concentration of about 58% by weight or less of the total weight of the composition.

In one embodiment, the thermally conductive composition has a total thermally conductive filler content of about 40% or less by volume (v/v) of the composition.

In one embodiment, the thermally conductive composition has a boron nitride concentration of about 41 wt. % or less of the composition; about 37 wt. % of less of the composition; about 31 wt. % or less of the composition; about 25 wt. % or less of the composition; even about 23 wt. % or less of the composition.

In one embodiment, the thermally conductive composition has a total filler volume fraction is about 45 percent or less by volume of the total composition.

In one embodiment, the thermally conductive composition has an in-plane thermal conductivity is at least 10 W/mK.

In one embodiment, the thermally conductive composition has a notched Izod impact value of 20 J/m or greater; 25 J/m or greater; 30 J/m or greater; even 35 J/m or greater.

In one embodiment, the thermally conductive composition has a tensile strength value of 7000 psi or greater; 8000 psi or greater; even 9000 psi or greater.

In one embodiment, the thermally conductive composition has a strain at break value of 0.8% or greater; 1.0% or greater; even 1.3% or greater.

In another aspect, the present invention provides shaped articles from the thermally conductive compositions. In still another aspect, the present invention provides a thermal management assembly comprising a shaped article formed from the thermally conductive compositions.

The present compositions can exhibit good thermal conductivity in the in-plane direction, the through-plane direction or both, even at relatively low loadings of an expensive thermally conductive filler such as boron nitride. This allows for production of thermally conductive compositions at significantly reduced costs. The present compositions also exhibit good electrical resistivity and dielectric strength. In one embodiment, the volume resistivity is at least $10^{12}$ Ohm-cm and the surface resistivity is at least $10^{12}$ Ohm/sq. In one embodiment, the dielectric strength is at least 250 V/mil (1 mil=0.001 inches). In one embodiment, the dielectric strength is at least 750 V/mil.

In another aspect, the present invention provides a method of extruding a thermally conductive plastic composition. The invention provides in one aspect, a system and method that overcomes problems associated with producing boron nitride/plastic compositions. In particular, boron nitride can be difficult to compound with plastics and may not disperse well in the plastic matrix. This can lead to material backing up in the feed throat of the extruder and blocking of the die exits by slugs of undispersed boron nitride powder. The present invention provides extruder screw configurations and methods of using the same that can avoid these problems. The present extruder screw configurations can also allow for the processing of boron nitride agglomerates into plastic compositions. Conventional screws typically cause agglomerates to be broken up or degraded. Using the present extruder screws, boron nitride agglomerates can be employed as fillers and provide plastic compositions that exhibit isotropic behavior (i.e., good in-plane and through-plane conductivity).

In one embodiment, the present invention comprises introducing the boron nitride particles into an extruder screw via a screw comprising shovel elements. In one embodiment, the present invention provides a method of manufacturing a thermally conductive composition comprising introducing a polymeric material into an extruder; introducing a thermally conductive filler material into the extruder; forming a melt blend comprising the polymeric material and the thermally conductive filler material, wherein the extruder comprises an inlet for introducing material into the extruder and an extruder screw, the extruder screw comprising a section of kneading elements downstream of the inlet and a section of fractional mixing elements downstream of the kneading elements.

In one aspect, the present invention provides a method of manufacturing a thermally conductive composition comprising introducing a polymeric material into an extruder; introducing a thermally conductive filler material into the extruder; forming a melt blend comprising the polymeric material and the thermally conductive filler material; and extruding the melt to form an extrudate, wherein the extruder comprises an inlet for introducing material into the extruder and an extruder screw, the extruder screw comprising a section of kneading elements located downstream of the inlet, and a section of fractional mixing elements, screw mixing elements, turbine mixing elements, stirrer elements, or a combination of two or more thereof downstream of the kneading elements.

In another aspect, the present invention provides a thermally conductive composition comprising a polymer material; and a thermally conductive filler dispersed in the polymer material, wherein the composition has an in-plane thermal conductivity of about 2 W/mK or greater, a through-plane thermal conductivity of about 0.5 W/mK or greater, or both.

Figure 1:
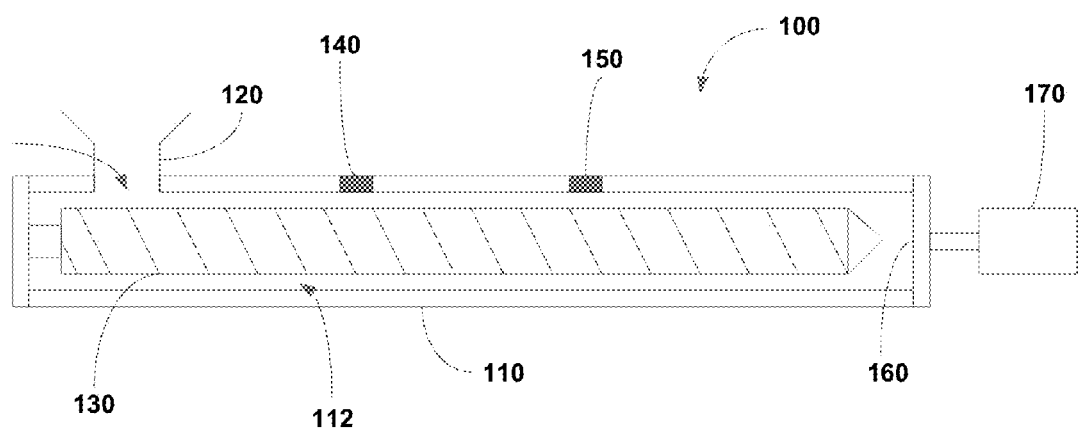
FIG. 1 is a schematic side view of an extruder suitable for processing a thermally conductive plastic material in accordance with embodiments of the invention.

The figures are merely examples of possible embodiments of the invention and are not intended to limit the scope of the invention. Other aspects of the invention are further illustrated and understood in view of the following description.

DETAILED DESCRIPTION

Thermally Conductive Plastic Compositions

A thermally conductive plastic composition comprises a polymer matrix and a thermally conductive filler. In one embodiment, the thermally conductive plastic composition comprises a polymer matrix and a boron nitride material. In another embodiment, the composition comprises multiple thermally conductive fillers. In yet another embodiment, functionalization additives are used along with the thermally conductive fillers.

Polymer Matrix

The polymer matrix material can include any polymer or resin material as desired for a particular purpose or intended application. In one embodiment, the polymer/resin material can be a thermoplastic material. In another embodiment, the polymer/resin material can be a thermoset material. Examples of suitable polymer materials include, but are not limited to, polycarbonate; acrylonitrile butadiene styrene (ABS) ($C_8H_8C_4H_6C_3H_3N$); polycarbonate/acrylonitrile butadiene styrene alloys (PC-ABS); polybutylene terephthalate (PBT); polyethylene therephthalate (PET); polyphenylene oxide (PPO); polyphenylene sulfide (PPS); polyphenylene ether; modified polyphenylene ether containing polystyrene; liquid crystal polymers; polystyrene; styrene-acrylonitrile copolymer; rubber-reinforced polystyrene; poly ether ketone (PEEK); acrylic resins such as polymers and copolymers of alkyl esters of acrylic and methacrylic acid styrene-methyl methacrylate copolymer; styrene-methyl methacrylate-butadiene copolymer; polymethyl methacrylate; methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra-high molecular weight polyethylene; high density polyethylene; linear low density polyethylene;

polyethylene napthalate; polyethylene terephthalate; polypropylene; chlorinated polyethylene; ethylene acrylic acid copolymers; polyamides, for example, nylon 6, nylon 6,6, and the like; phenylene oxide resins; phenylene sulfide resins; polyoxymethylenes; polyesters; polyvinyl chloride; vinylidene chloride/vinyl chloride resins; and vinyl aromatic resins such as polystyrene; poly(vinylnaphthalene); poly(vinyltoluene); polyimides; polyaryletheretherketone; polyphthalamide; polyetheretherketones; polyaryletherketone, and combinations of two or more thereof.

The choice of polymer matrix material may depend on the particular requirements of the application for which the thermally-conductive plastic is to be used. For example, properties such as impact resistance, tensile strength, operating temperature, heat distortion temperature, barrier characteristics, and the like are all affected by the choice of polymer matrix material.

In some embodiments, the polymer matrix material can include one or more polyamide thermoplastic polymer matrices. A polyamide polymer is a polymer containing an amide bond (—NHCO—) in the main chain and capable of being heat-melted at temperatures less than about 300 degrees Celsius. Specific examples of suitable polyamide resins include, but are not limited to, polycaproamide (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecanamide (nylon 11), polydodecanamide (nylon 12), polytrimethylhexamethylene terephthalamide (nylon TMHT), polyhexamethylene isophthalamide (nylon 61), polyhexamethylene terephthal/isophthalamide (nylon 6T/61), polynonamethylene terephthalamide (nylon 9T), polybis(4-aminocyclohexyl)methane dodecamide (nylon PACM12), polybis(3-methyl-4-aminocyclohexyl)methane dodecamide (nylon dimethyl PACM12), polymethaxylylene adipamide (nylon MXD6), polyundecamethylene terephthalamide (nylon 11T), polyundecamethylene hexahydroterephthalamide (nylon 11T(H)) and their copolymerized polyamides and mixed polyamides. Among these, nylon 6, nylon 46, nylon 66, nylon 11, nylon 12, nylon 9T, nylon MXD6, and their copolymerized polyamides and mixed polyamides are exemplary in terms of availability, handleability and the like.

It will be appreciated that the base polymer resins can be modified or provided with other fillers or additives, other than the thermally conductive fillers or silane additives, to modify other properties such as impact resistance, UV stability, fire retardancy, etc.

While aspects and embodiments of the present invention are discussed with respect to applications for producing thermoplastic materials, it will be appreciated that the processing methods, thermally conductive fillers, and silane additives discussed and described herein can easily be translated to applications employing thermoset resins including, but not limited to, silicones, epoxies, acrylics, phenolics, novolacs, etc.

Thermally Conductive Fillers

The thermally conductive plastic compositions comprise a thermally conductive filler. It will be appreciated that the compositions can comprise a plurality of thermally conductive fillers. In one embodiment, the thermally conductive filler can be chosen as desired for a particular purpose or application. In one embodiment, the thermally conductive filler is chosen from boron nitride, silica, glass fibers, a metal oxide such as, zinc oxide, magnesium oxide, beryllium oxide, titanium oxide, zirconium oxide, yttrium oxide, etc., calcium carbonate, talc, mica, wollastonite, clays, exfoliated clays, alumina, aluminum nitride, graphite, metallic powders, e.g., aluminum, copper, bronze, brass, etc., or a combination of two or more thereof. In one embodiment, the thermally conductive filler has a low electrical conductivity or is electrically insulating.

In one embodiment, the thermally conductive plastic composition comprises boron nitride. Examples of suitable boron nitride materials include boron nitride particles, boron nitride agglomerates, or a mixture thereof. Boron nitride particles generally exhibit a platelet form. In one embodiment, the boron nitride particles can be platelets having a particle size of 0.3 to about 200 microns and a surface area of from about 0.25 to about 100 $m^2$/gram. In one embodiment, the platelet boron nitride particles have a particle size of about 0.5 to 150 microns; about 1 to about 100 microns, about 10 to 90 microns; about 20 to 75 microns; even about 40 to 60 microns. In another embodiment, the thermally conductive plastic composition comprises boron nitride agglomerates. The agglomerates can have a mean particle size of from about 5 to about 500 microns and a surface area of about 0.25 to about 50 $m^2$/gram. In one embodiment, the platelet boron nitride particles have a particle size of about 10 to 400 microns; about 20 to about 300 microns, about 30 to 200 microns; about 40 to 150 microns; even about 50 to 100 microns. Particle size can be measured using a Horiba LA300 particle size distribution analyzer where the particle to be analyzed (e.g., BN) is introduced in an amount adjusted to meet the required transmission. A few drops of 2% Rhodapex CO-436 can be added to improve the dispersion of the powder, and the particle size can be measured using laser diffraction after a 3 second sonication. The particle size distribution resulting from the measurement can be plotted on a volume basis and the D90 represents the $90^{th}$ percentile of the distribution.

In one embodiment, the boron nitride platelet filler has an aspect ratio (which is defined as the ratio of the largest to smallest dimension of the particle) of at least 20:1; at least 30:1; at least 40:1; at least 50:1; even at least 100:1. In another embodiment, the boron nitride agglomerate filler has an aspect ratio of no more than 5:1, 3:1, or even 2:1. Suitable boron nitride materials include platelet boron nitride and boron nitride agglomerates available from Momentive Performance Materials. In one embodiment, the boron nitride comprises a majority of the thermally conductive fillers added in the composition. Here, as elsewhere in the specification and claims, numerical values can be combined to form new or non-disclosed ranges.

The present composition can exhibit excellent through-plane composition without the addition of additional additives such as expanded or carbon fiber graphite as required by U.S. Pat. No. 7,723,419. In one embodiment, the composition can consist essentially of boron nitride fillers. In another embodiment, the composition is substantially free of expanded graphite or other carbon-based fillers.

In one embodiment, the filler material has a tap density of about 35% or less of the materials theoretical density; about 33% or less of the materials theoretical density; even about 30% or less of the materials theoretical density. In one embodiment, the filler material comprises boron nitride agglomerates having a powder tap density ranges from about 0.3 g/cc to about 0.8 g/cc; from about 0.4 g/cc to about 0.7 g/cc; even from 0.45 g/cc to 0.7 g/cc. In another embodiment, the filler material comprises boron nitride platelets with a powder tap density of 0.2 g/cc to 0.7 g/cc. Here, as elsewhere in the specification and claims, numerical values can be combined to form new or non-disclosed ranges.

In one embodiment, the compositions comprise one or more of glass fibers, glass flake, clays, exfoliated clays, or other high aspect ratio fibers, rods, or flakes as a thermally conductive filler component. In one embodiment, the glass fiber has an aspect ratio of at least 20; at least 30; at least 40; at least 50; even at least 100. In one embodiment, the glass flake has an aspect ratio of at least 40; at least 50; at least 60. Here as elsewhere in the specification and claims, numerical values can be combined to form new and non-disclosed ranges.

Additives

In one embodiment, the thermally conductive compositions comprise a functionalization additive such as, for example, a silane additive. In one embodiment, the silane additive can be chosen from an alkacryloxy silane, a vinyl silane, a halo silane (e.g., a chlorosilane), a mercapto silane, a blocked mercaptosilane, a thiocarboxylate silane, or a combination of two or more thereof. In one embodiment, the thermally conductive compositions can comprise from about 1 to about 5 wt. % of a silane; from about 1.5 to about 4 wt. %; even from about 2.7 to about 3.7 wt. % of the fillers.

In one embodiment, the silane can be represented by $Y\text{---}R^1\text{---}Si(R^2)_n(R^3)_{3-n}$, wherein Y represents $R^4R^5N\text{---}$, $R^7R^8N\text{---}R^6\text{---}NR^4\text{---}$, or $R^{11}R^{10}N\text{---}R^9\text{---}R^7N\text{---}R^6\text{---}NR^4\text{---}$; or Y and $R^1$ ($Y\text{---}R^1$) conjointly represent a vinyl group, an alkyl group, a phenyl group, a 3,4-epoxycyclohexyl group, a halogen atom, a mercapto group, an isocyanate group, a thiocarboxylate group, an optionally substituted glycidyl group, a glycidoxy group, an optionally substituted vinyl group, a methacryloxy group ($CH_2\text{=}C(CH_3)COO\text{---}$), an acryloxy group ($CH_2\text{=}CHCOO\text{---}$), a ureido group ($NH_2CONH\text{---}$), an optionally substituted methacryl group, an optionally substituted epoxy group, an optionally substituted phosphonium halide group, an optionally substituted ammonium halide group, or an optionally substituted acryl group; $R^4$, $R^5$, $R^7$, $R^8$, $R^{10}$ and $R^{11}$ independently represent a hydrogen atom or a $C_{1-6}$ alkyl group; $R^6$ and $R^9$ independently represent a $C_{2-6}$ alkylene group; $R^1$ is a single bond, an alkylene group, or a phenylene group; or $R^1$ and Y ($Y\text{---}R^1$) conjointly represent a vinyl group; each $R^2$ independently represents an alkyl group or a phenyl group; each $R^3$ independently represents a hydroxy group or an alkoxy group; and n is an integer of 0 to 2).

Suitable vinyl silanes include are those having the formula: $R^{12}SiR^{13}{}_nY_{(3-n)}$, where $R^{12}$ is an ethylenically unsaturated hydrocarbyl, hydrocarbyloxy, or (meth)acryloxy hydrocarbyl group, $R^{13}$ is an aliphatic saturated hydrocarbyl group, Y is independently a hydrolysable organic group, and n is 0, 1 or 2. In one embodiment Y is an alkoxy group of an alkyl having from 1 to 6 carbon atoms, such as methoxy, ethoxy, propoxy and butoxy. In one embodiment, $R^{12}$ can be chosen from vinyl, allyl, isoprenyl, butenyl, cyclohexyl or γ-(meth)acryloxy propyl; Y can be chosen from methoxy, ethoxy, formyloxy, acetoxy, propionyloxy, or an alkylamino or arylamino group; and $R^{13}$, if present, can be chosen from a methyl, ethyl, propyl, decyl or phenyl group.

In one embodiment, the silane is a compound of the formula $CH_2\text{=}CHSi(OA)_3$ (2) where A is a hydrocarbyl group having 1 to 8 carbon atoms, and in one embodiment 1 to 4 carbon atoms.

In one embodiment, the silane is chosen from octanoylthio-1-propyltriethoxy silane; vinyl tris(2-methoxy-ethoxy)silane; vinyl trimethoxy silane, vinyl triethoxysilane gamma-methacryloxypropyltreimethoxy silane, vinyl triacetoxy silane, or a combination of two or more thereof. Examples of suitable silanes include, but are not limited to, those available from Momentive Performance Materials and sold under the tradename NXT. NXT is a thiocarboxylate silane and an example of the broader class of blocked mercaptosilanes.

Suitable silanes also include those described in U.S. Pat. Nos. 6,608,125; 7,078,551; 7,074,876; and 7,301,042.

The silane additive can be added at any point in processing of the composition. In one embodiment, the silane additive can be added in-site during the extrusion process at any point in the extrusion process. In another embodiment, the silane is added to a filler or filler composition prior to introduction into an extruder or other processing equipment.

In addition to silanes various other classes of functionalization additives can be added to improve the interface between the fillers and the resin matrix. Other examples of functionalization additives include organometallic compounds such as titanates & zirconates (Ken-react by Kenrich), aluminates, hyperdispersants (Solsperse by Lubrizol), maleated oligomers such as maleated polybutadiene resin or styrene maleic anhydride copolymer (Cray Valley), fatty acids or waxes and their derivatives, and ionic or non-ionic surfactants. These functionalization additives may be used at 1 wt % to about 15 wt % of fillers; or from about 3-12 wt %; even from about 5 to 10 wt % of the fillers.

In one embodiment, the filler materials such as the boron nitride and the metal oxide, and the silane additive can be added as separate components when compounding into a resin composition. The amounts of each component that can be included in the thermally conductive composition are described further herein.

Filler Compositions

In other embodiments, the filler components can be added as part of a filler composition comprising one or more of the respective filler components. In one aspect, the filler material is provided as a blend of boron nitride, a silane, and optionally one or more other filler materials.

In one embodiment, the filler is provided as a blend of a boron nitride material and a silane. The boron nitride and the silane can be any of those described above. The boron nitride can be treated with the silane by mixing the silane with the boron nitride material. The concentration of the silane can be about 0.1 weight percent to about 6 weight percent by weight of the boron nitride; about 0.5 weight percent to about 5 weight percent; about 1 weight percent to about 4 weight percent; even about 2 weight percent to about 3 weight percent.

In one embodiment, the thermally conductive filler is provided as a blend or composite of boron nitride, a metal oxide, a silane additive, and optionally other filler materials. In one embodiment, the thermally conductive filler composition comprises a blended composition comprising boron nitride in an amount of from about 20 weight percent to about 70 weight percent; a metal oxide in an amount of from about 5 weight percent to about 75 weight percent; and a silane additive in an amount of from about 0.1 weight percent to about 6 weight percent. In one embodiment, the thermally conductive filler composition comprises a blended composition comprising boron nitride in an amount of from about 5 weight percent to about 60 weight percent; a metal oxide in an amount of from about 15 weight percent to about 60 weight percent; and a silane additive in an amount of from about 0.5 weight percent to about 5 weight percent. In one embodiment, the thermally conductive filler composition comprises a blended composition comprising boron nitride in an amount of from about 30 weight percent to about 50 weight percent; a metal oxide in an amount of from about 20 weight percent to about 50 weight percent; and a silane additive in an amount of from about 1 weight percent to about 3.5 weight percent. In one embodiment, the thermally conductive filler composition comprises a blended composition comprising boron nitride in an amount of from about 35 weight percent to about 45 weight percent;

a metal oxide in an amount of from about 30 weight percent to about 40 weight percent; and a silane additive in an amount of from about 1.5 weight percent to about 2.5 weight percent. In still another embodiment, the thermally conductive filler comprises a blended composition comprising boron nitride in an amount of from about 5 weight percent to about 40 weight percent; a metal oxide in an amount of from about 5 weight percent to about 50 weight percent; and a silane additive in an amount of from about 1 weight percent to about 4 weight percent. Here as elsewhere in the specification and claims, numerical values can be combined to form new and non-disclosed ranges.

The blended filler composition can optionally include other filler components including, but not limited to, glass fibers, glass flake, clays, exfoliated clays, or other high aspect ratio fibers, rods, or flakes, calcium carbonate, zinc oxide, yttrium oxide, magnesia, titania, calcium carbonate, talc, mica, wollastonite, alumina, aluminum nitride, graphite, metallic powders, e.g., aluminum, copper, bronze, brass, etc., fibers or whiskers of carbon, graphite, silicon carbide, silicon nitride, alumina, aluminum nitride, zinc oxide, nano-scale fibers such as carbon nanotubes, graphene, boron nitride nanotubes, boron nitride nanosheets, zinc oxide nanotubes, etc., or a combination of two or more thereof. The additional filler components can be present in the blended filler in an amount of from about 0 to about 30 weight percent; from about 0.1 weight percent to about 30 weight percent; from about 1 weight percent to about 25 weight percent; from about 5 weight percent to about 20 weight percent; even from about 10 to about 15 weight percent.

In one embodiment, the blended filler composition comprises boron nitride, a metal oxide, a silane additive, and glass fiber or glass flake. As used herein "glass fiber" can also refer to and will encompass glass flake.

The composite or blended filler compositions can be prepared by any suitable method to mix the various components in the filler composition. In one embodiment, the boron nitride, metal oxide, and optional additional filler are mixed together in a blender and the silane additive is introduced into the blender. The composite or blended filler composition can be a substantially homogeneous mixture or blend of the component materials. For example, these blends can be carried out in a v-blender with a provision to introduce a liquid into the blender. Various types of intensifier bars can be chosen for the v-blender for optimal mixing of the various fillers. The blender can be operated as a simple tumbler without the intensifier bar operated for the whole or part of the blend cycle to preserve the integrity of fragile filler such as boron nitride agglomerates, ceramic or glass fibers etc. Other suitable examples may be ribbon blenders, paddle blenders, tumblers etc.

The blend of the boron nitride and the silane (and the optional other filler materials, e.g., a metal oxide) can be treated prior to introduction into the resin composition to covalently bind the silane to the filler material. This can be accomplished by subjecting the blend of the boron nitride and the silane to conditions to hydrolyze the silane and allow the hydrolyzed silane to react with the filler surface. In one embodiment, treating the blended filler can be carries out by exposing the material to moisture and heat. While not being bound to any particular theory, heat treating the filler comprising the blend of the boron nitride and the silane can cause condensation of the silane on the filler and chemically react and bind the silane to the filler surface. The inventors have found that heat treating the blended filler compositions prior to use in the resin composition can improve the thermal conductivity of the composition. While the blended filler can be exposed to temperatures during processing of the resin composition that are capable of binding the silane to the filler materials, silane material that is not bonded to the filler material can potentially evaporate at the high processing temperatures.

In one embodiment, the blend of the boron nitride and the silane can be treated by heating at 50° C. for seventy two hours in a convection oven. In another embodiment, the filler blend comprising boron nitride, a metal oxide and an optional glass fiber and the silane can be heat treated at 60° C. for four hours. In one embodiment the heat treatment is at 80° C. for two hours. In one embodiment the heat treatment is carried out under controlled moisture conditions. In one embodiment the heat treatment is carried out at 50° C. and 50% relative humidity for twenty four hours.

The filler compositions can have a color as desired for a particular purpose or intended application. In one embodiment, the filler composition is white in appearance. As used herein, the filler composition is considered to be "white" when it has a color measured in the $L^*$, $a^*$, $b^*$ space with a D65 light source and a 2 degree or a 10 degree observer where $L^*$ is greater than 90, $a^*$ is between −1.3 and 1.3, and $b^*$ is between −2.5 and 2.5. In one embodiment, the color of the filler is such that $L^*$ is greater than 92, $a^*$ is between −1.0 and 1.0, and $b^*$ is between −2.0 and 2.0. Other colors may provided depending on the application of the final resin product. In one embodiment, the filler composition has an $L^*$ value of at least 85, an $a^*$ value between −1.5 to 1.5; and a $b^*$ value between −3.0. and 3.0. The color can be measured by any suitable method. In one embodiment, the color is measured with a Minolta Spectrophotometer Model CM2002. The powders are placed in a clean quartz beaker sufficiently large to cover the source and detector and placed over the instrument for the measurement. The instrument uses a standard D65 light source and the measurements are made with either a 2° or a 10° observer.

Thermally Conductive Resin Compositions

The thermally conductive plastic compositions can comprise from about 20 to about 80 wt. % of the polymer matrix; from about 30 to about 70 wt. % of the polymer matrix; from about 35 to about 65 wt. % of the polymer matrix; even from about from about 42 to about 58 wt. % of the polymer matrix, and from about 20 to about 80 wt. % of thermally conductive filler; from about 25 to about 65 wt. % of thermally conductive filler; from about 30 to about 58 wt. % of thermally conductive filler; even from about 35 to about 55 wt. % of thermally conductive filler. In one embodiment, the total concentration of thermally conductive filler material is about 60 wt. % or less; about 55 wt. % or less; even about 50 wt. % or less. The volume of polymer matrix in the composition by percent volume (v/v) can range from 20% to about 90%; from 30% to about 80%; from 40% to about 70%; even from 35% to about 65%, and the volume of the thermally conductive filler can range from 10% to about 80%; from 15% to about 65%; from 20% to about 50%; even from 25% to about 45%. The through-plane thermal conductivity is measured at the center of the tab portion of an ASTM standard dog-bone away from the molding gate using the laser flash method (ASTM E1461) utilizing the theoretical specific heat capacity ($C_p$) values based on the composition. The in-plane thermal conductivity is measured by constructing a laminate sample from the same location as the through-plane measurement method where the laminate sample is constructed in such a way that the thermal conductivity in the plane of the dog-bone sample can be measured either in the flow direction or perpendicular to the flow direction. Tensile properties are measured on an Instron UTM and impact strength on a TMI Impact Tester according to ASTM standards D638 and D256, respectively. For lab-scale experiments, the compounding is carried out in a Brabender Plasticorder batch mixer. The compounded sample is compression molded to <0.4 mm and the in-plane thermal conductivity is measured using a modified laser flash method using a special sample holder and an in-plane mask (Netzsch Instruments). For a given composition, both methods of measuring the in-plane thermal conductivity yield comparable results.

In one embodiment, the composition comprises boron nitride in an amount of from about 20 wt. % to about 60 wt. %; from about 25 wt. % to about 50 wt. %; even from about 30 wt. % to about 42 wt. %. In one embodiment, the thermally conductive composition comprises from about 30 to about 40 wt. % of a boron nitride. In one embodiment, the boron nitride filler comprises boron nitride agglomerate. In one embodiment, the boron nitride filler comprises boron nitride platelets. In one embodiment, the composition comprises 26.2 wt. % platelet BN, 13.4 wt. % Zinc Oxide and 15.4 wt. % Glass fibers, the balance being the resin. In one embodiment, the composition comprises 20 wt. % BN and 30 wt. % glass fiber. In one embodiment, the composition comprises 24 wt. % BN and 30 wt. % glass fiber. In one embodiment, the composition comprises 35 wt. % BN and 20 wt. % glass fiber. In one embodiment, the composition comprises 31.2 wt. % BN, 19.4 wt. % ZnO, and 2.3 wt. % GF. In one embodiment, the composition comprises 20 wt. % BN and 50 wt. % ZnO. Here as elsewhere in the specification and claims, numerical values can be combined to form new and non-disclosed ranges In one embodiment, a thermally conductive plastic composition comprises boron nitride, a metal oxide, such as, zinc oxide, etc., a silane, magnesium oxide, and optionally glass fiber or glass flake as thermally conductive fillers. In one embodiment, the composition comprises from about 30 to about 40 wt. % of boron nitride, from about 5 to about 20 wt. % of a metal oxide, zinc oxide, from about 0.1 wt. % to about 5 wt. % of a silane and from 0 to about 10 wt. % of glass fibers or glass flakes. The amount of the filler components e.g., boron nitride, metal oxide, silane, glass fiber, etc., in the thermally conductive plastic composition refers to the amount of the final plastic composition irrespective of whether the filler components are added individually or as part of a blended filler composition.

The thermally conductive compositions can exhibit excellent thermal conductivity. In one embodiment, the thermally conductive compositions have an in-plane thermal conductivity of about 2 W/mK or greater; about 3.5 W/mK or greater; about 5 W/mK or greater; even about 10 W/mK or greater. In one embodiment, the thermally conductive compositions comprise boron nitride agglomerates and have a through-plane thermal conductivity of about 0.8 W/mK or greater; about 0.9 W/mK or greater; about 1.0 W/mK or greater; 1.3 W/mK or greater; even about 1.5 W/mK or greater. In one embodiment, the thermally conductive compositions have an in-plane thermal conductivity to through-plane thermal conductivity of about 3.5:1 or lower; about 3.25:1 or lower; about 3:1 or lower; even about 2.5:1 or lower.

The density of the composition can be adjusted as desire for a particular purpose or intended use. In one embodiment, the composition has a density of about 1.7 g/cm$^3$ or less.

Extruder Screws and Methods of Extruding Thermally Conductive Plastics

Thermally conductive compositions and articles formed from such compositions can be produced using mixing, blending, and compounding techniques such as, for example, an extrusion compounding process. Extrusion compounding of plastic materials generally employs an extruder screw to blend the polymer composition and convey the material toward a die. The screw can include, but is not limited to a single screw or twin screw. Twin screws can comprise co-rotating twin screws, counter rotating twin screws, co-rotating intermeshing twin screws, etc. In one embodiment, the extrusion compounding process can use a twin screw compounding extruder.

FIG. 1 is a schematic illustration of an extruder system 100 suitable for use in accordance with aspects of the invention. The extruder 100 includes a housing 110 defining a cavity 112 in which the polymeric material and filler are introduced, compounded or blended into a melt, and conveyed. The extruder includes a hopper 120 positioned above an inlet port or feed throat 122. The polymeric material is generally introduced into the extruder via hopper 120. As discussed in further detail herein, the filler material, including the boron nitride can be introduced into the extruder through hopper 120. The extruder includes a screw 130 for conveying and blending the polymeric material. Aspects of the screw are further described in greater detail herein. The extruder can include other components including vents such as atmospheric vent 140 and vacuum vent 150 to release pressure that builds up in the extruder cavity during processing or to re-pressurize the system prior to introduction of the material into a mold or die like a strand die or a profile. The extruder can also include other entry ports or side feeders as desired to introduce material into the extruder at locations downstream of the hopper 120. The screw conveys the polymeric material through the extruder to outlet port 160 where the polymeric material exits the extruder and is introduced into a mold cavity 170 to form a plastic article of a desired shape. In one embodiment, the compounded plastic material exits the extruder through a strand die to make continuous strands, e.g., about 1 mm to about 5 mm in diameter, which is then fed into a pelletizer to make pellets. In a secondary operation, such as injection molding or compression molding, the pellets can then be formed into the final desired shape.

Compounding boron nitride into a plastic composition using a conventional, general purpose screw configuration that simply comprises conveying elements and kneading elements has been found to result in insufficient dispersion of boron nitride filler into the polymer matrix, backup of material at the feed throat, surging, and blockage of the die exits, especially at higher filler loadings.

In one embodiment, a screw configuration for compounding a thermally conductive plastic composition comprising boron nitride comprises shovel elements in a location where the boron nitride particles are introduced into the extruder. In one embodiment, the boron nitride filler can be introduced into the extruder with the polymeric material, and the extruder screw is configured such that it comprises shovel elements adjacent to or near the inlet (e.g., in the vicinity of hopper 120 and feed throat 122 of the extruder of FIG. 1). In one embodiment, the extruder can comprise a side feeder with a separate screw in the side feeder for conveying material into the main extruder body. In one embodiment, the side feeder screw comprises shovel elements for conveying the boron nitride material into the polymer mix in the main extruder. In another embodiment, a screw configuration further comprises a pair of fractional lobe mixing elements (FMEs), stirrer elements, screw mixing elements, turbine mixing elements, or a combination of two or more thereof to facilitate dispersion of the filler material into the polymer mix. In one embodiment, the screw comprises one or more pairs of forward and reverse FMEs. In another embodiment, the screw comprises stirrer elements. Suitable screw elements are available from Steer America.

Figure 2:
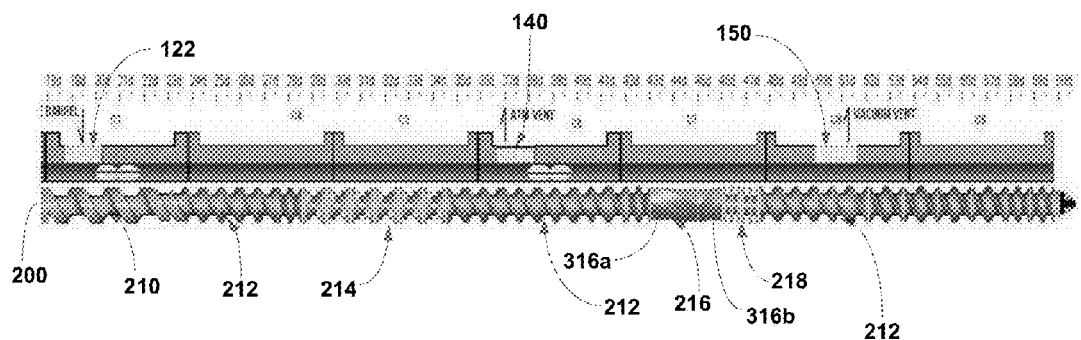
FIG. 2 illustrates one embodiment of an extruder screw that can be used in a process in accordance with an embodiment of the invention.

FIG. 2 illustrates one embodiment of a screw configuration for use in compounding a thermally conductive plastic composition comprising boron nitride filler. In FIG. 2, the boron nitride filler is introduced into the extruder through the inlet 122. The screw 200 comprises shovel elements 210 in a location at or near the inlet 122, and the shovel element section extends downstream of the inlet. The screw comprises a section of conveying elements 212 downstream of the shovel elements to convey the material along the extruder. A section of kneading elements 214 is provided to melt and knead the plastic material. The screw further comprises a section of fractional lobe mixing elements 216. As shown in FIG. 2, the fractional lobe mixing elements 216 includes a section 216a having a forward fractional mixing element and a section 216b comprising a reverse fractional mixing element. While the kneading elements 214 are suitable for melting the plastic, the kneading section may not sufficiently disperse the filler throughout the polymer melt. The fractional mixing elements 216 have been found to help aid dispersion of the boron nitride particles in the polymer melt. The screw in FIG. 2 further includes a section of neutral kneading blocks 218 adjacent the FMEs 216. The neutral kneading blocks may further facilitate dispersion and can increase the residence time of the melt at the FME block to ensure good dispersion of the material.

In one embodiment, the kneading element section of the screw can be from about 10% to about 20% of the length of the screw element; from about 12% to about 18% of the length of the screw; even from about 13% to about 16% of the length of the screw.

Figure 3:
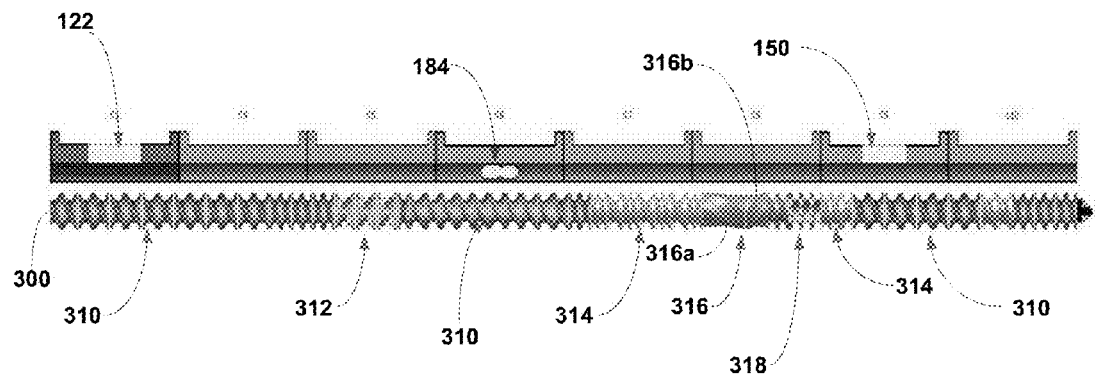
FIG. 3 illustrates one embodiment of an extruder screw that can be used in a process in accordance with another embodiment of the invention.
Figure 4:
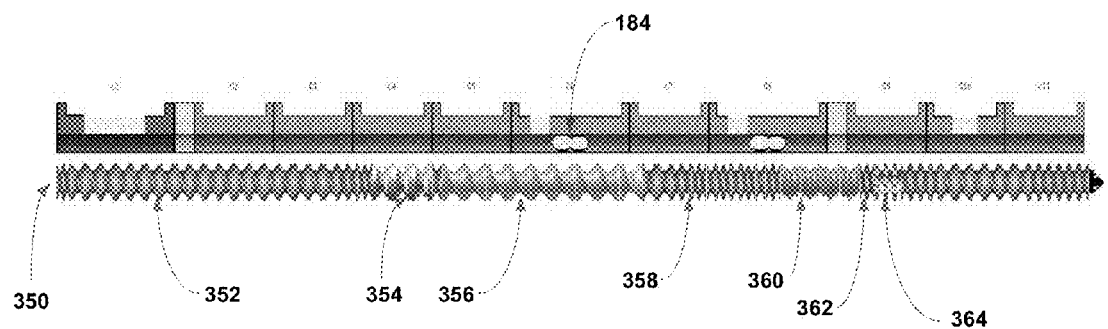
FIG. 4 illustrates one embodiment of an extruder screw that can be used in a process in accordance with one embodiment of the invention.
Figure 5:
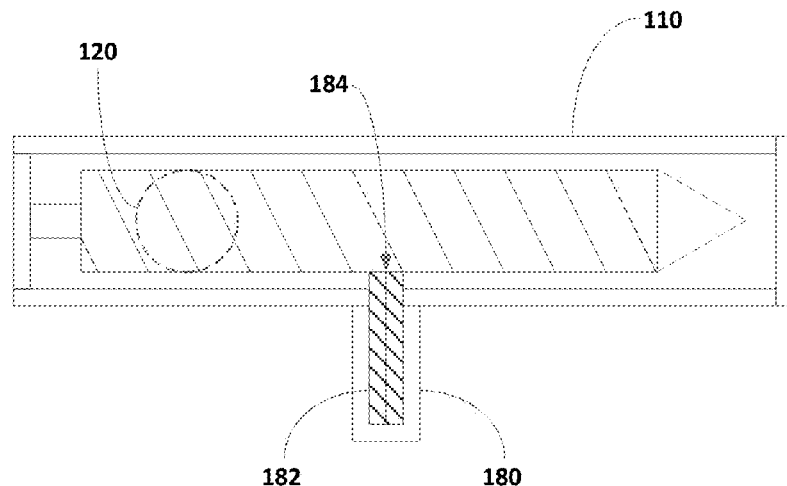
FIG. 5 is a schematic top view of an extruder system suitable for processing a thermally conductive plastic material in accordance with embodiments of the invention.

FIGS. 3-5 illustrate other embodiments of an extruder system for use in processing thermally conductive plastic compositions. As shown in FIG. 3, the system includes a screw configuration 300. The system and screw configuration are suitable for methods of manufacturing the material where the filler material is introduced separately from and downstream of the location where the polymer material is introduced into the extruder. As shown in FIG. 3, the screw 300 comprises a section of kneading elements 312 located downstream of the inlet 122, and a section of fractional mixing elements 316 located downstream of the kneading elements. The fractional mixing element section comprises a section 316a with forward fractional mixing elements and a section 316b of reverse fractional mixing elements. The screw 300 comprises screw mixing elements 318 and turbine mixing elements 320 adjacent to and downstream of the fractional mixing elements 316. The extruder system comprises a side feeder 180 (FIG. 5) for introducing the thermally conductive filler into the extruder.

FIG. 4 illustrates another embodiment of a screw configuration for use with aspects of the invention. The screw 350 includes conveying elements 352, 356, and 358, and kneading elements 356. The screw in FIG. 4 comprises stirrer elements 360 instead of the fractional mixing elements that are included in screw 300 of FIG. 3. Applicants have found that the stirrer elements can provide good mixing of the filler material with the polymer material to allow for good dispersion of the filler material within the polymer matrix without degrading boron nitride agglomerates. The screw 350 further includes screw mixing elements 362 and turbine elements 364.

It will be appreciated that suitable screws are not limited to the embodiments of FIGS. 2-4, and that various screw elements could be switched. For example, in one embodiment, a screw may be provided, similar to FIG. 2, but the fractional mixing elements can be replaced with stirrer elements. Further, the shovel elements used in these configurations may have a single lobe or may be bi-lobed. The FMEs can be replaced by other equivalent elements that minimize the peak shear at the element and provide relatively uniform shear across the element. The FMEs can have four lobes, but can possibly have three lobes, or five or more lobes. While processing platelet boron nitride grades where agglomerate breakdown is not a concern, the dispersion can be further improved by adding Fractional Kneading Blocks (FKBs) either upstream or downstream of the FMEs. The dispersion can also be improved by adding multiple FMEs, or multiple sets of FMEs, SMEs, and TMEs.

As shown in FIG. 5, the side feeder is positioned downstream of hopper 120 and inlet 122 and downstream of the kneading elements 312. The side feeder comprises a feeder port 184 for introducing the material in to the extruder housing 112. The side feeder can include a screw element 182 for conveying the filler material into the extruder through the feeder port 184. The side feeder screw 182 comprises shovel elements for conveying the thermally conductive filler material into the main extruder body. (Can we flip FIG. 5-180 & 182 below?

In one embodiment, an extruder system such as that illustrated in FIGS. 3-5 is employed for processing a composition comprising boron nitride agglomerates. It has been found that subjecting boron nitride agglomerates to kneading elements employed for melting and kneading the polymer can cause the agglomerates to break down, which can reduce or destroy the isotropric behavior of these materials. In certain applications, it may be desirable for the molded article to exhibit good thermal conductivity in both the in-plane and through-plane directions. The extruder system of FIGS. 3 and 4 allow for the formation of a polymer melt through the action of the kneading elements. The boron nitride agglomerates can then be introduced and dispersed into the polymer melt without being subjected to the forces required to form the melt in the kneading section. This allows the boron nitride agglomerates to be maintained as agglomerates to provide a composition with good in-plane and through-plane thermal conductivity.

The speed of the extruder screw can be selected as desired for a particular purpose or intended use. The screw speed can be used to control the speed through which the material is conveyed through the extruder, the extent of shear rates and shear stresses witnessed by the plastic and the fillers, and can affect the mixing of the materials. It has been found that plastic compositions with high through-plane thermal conductivity can be obtained even at high screw speeds by processing boron nitride agglomerates using screw configuration in accordance with aspects and embodiments of the present invention. In embodiments, the screw speed on a 40 mm twin screw extruder can be from about 100 RPM to about 1,000 RPM; from about 150 RPM to about 800 RPM; from about 200 RPM to about 600 RPM; even from about 300 RPM to about 500 RPM. In one embodiment, the screw speed is from about 100 RPM to about 500 RPM. In another embodiment, the screw speed is from about 100 RPM to about 450 RPM. In still another embodiment, the screw speed is about 100 RPM, about 150 RPM, about 400 RPM, about 500 RPM, even about 800 RPM. The screw speed can be scaled accordingly to other extruder sizes based on the tip speed at the edge of the screw. Here as elsewhere in the specification and claims, ranges can be combined to form new and non-disclosed ranges. The above embodiments also enable good dispersion and high in-plane thermal conductivity when platelet boron nitride grades are used. In formulations with multiple thermally conductive or reinforcing fillers, the above embodiments enable retention of the shape of friable fillers such as ceramic or glass fibers.

In addition to the details of the extrusion screw configurations discussed above, other attributes of the extruder can play a role in realizing the requisite final product performance or process throughput for a commercially feasible product. Two such key factors are the diameter ratio and the tolerance between the barrel and the screw. The diameter ratio, referred to as $D_o/D_i$, is the ratio of the outer diameter to the inner diameter of the screw and determines the free volume available to process material in the extruder. The higher the diameter ratio, the more the free volume available in the extruder, which translates to higher throughput from the equipment. High throughput minimizes the processing cost, which is important to make a cost-effective commercial product. The screw-to-barrel tolerance determines the fraction of material that sees a high shear environment in the extruder. The tighter (smaller) the tolerance, the lower the fraction of material that sees the high-shear in the process.

In one embodiment, extrusion is carried out in a Steer OMega series 40 mm extruder. The OMega series has a $D_o/D_i$ ratio of 1.71, which is significantly higher than the 1.49 or 1.55 ratios commonly used in the industry. The 1.71 ratio enables faster processing and higher throughput than similar size equipment with 1.49 or 1.55 ratios. The OMega series also has very tight tolerances between the screw and the barrel. On a 40 mm barrel, the screw outer diameter is 39.7 mm, which represents a gap of 0.15 mm on each side between the barrel and the screw, significantly tighter than the commonly used 0.3-0.5 mm tolerances. This tight tolerance ensures that only a negligible fraction, if any, of the material sees the highest shear rate zone in the extruder which is the gap between the screw and the barrel.

The temperature of the extrusion process can be selected based on the polymer material and the filler materials being processed.

Articles

The thermally plastic compositions and methods of making such compositions can be used to form molded articles that can be used in a variety of applications. The articles can be shaped to various forms as desired for a particular purpose or intended use. In one embodiment, the articles can form part of a heat sink structure for thermal management in a variety of applications including lighting assemblies, battery systems, sensors and electronic components, portable electronic devices such as smart phones, MP3 players, mobile phones, computers, televisions, etc.

While aspects of the present technology have been described with respect to the detailed description and various embodiments, further aspects of the invention can be further understood in view of the following examples. The examples are only for the purpose of further illustrating possible embodiments of the invention and are not intended to limit the invention or the scope of the appended claims.

EXAMPLES

Plastic compositions comprising Momentive BN powder grades and a plastic material such as polycarbonate (PC— Sabic Lexan HF1110) or nylon (PA6—Chemlon 212 or 212H, PA66—Chemlon 100 from Teknor Apex) are compounded on 20 mm and 40 mm twin screw extruders with L/D of about 40-50 on Steer extruders at Steer America's Application Development Center in Uniontown, Ohio. Samples are injection molded on a Van Dorn 55-ton injection molding equipment to make ASTM standard dog-bones (⅛" thick) to test thermal conductivity and tensile properties, and bars to evaluate for impact strength of the materials.

Thermally conductive compositions comprising a thermoplastic resin and various thermally conductive fillers are compounded in twin screw extruders (20 mm or 40 mm diameter) and ASTM standard dog-bones are injection molded using a tab gate at 1 inch/s. The through-plane thermal conductivity is measured at the center of the tab portion of an ASTM standard dog-bone away from the molding gate using the laser flash method (ASTM E1461) utilizing the theoretical specific heat capacity ($C_p$) values based on the composition. The in-plane thermal conductivity is measured by constructing a laminate sample from the same location as the through-plane measurement method where the laminate sample is constructed in such a way that the thermal conductivity in the plane of the dog-bone sample can be measured either in the flow direction or perpendicular to the flow direction. Tensile properties are measured on an Instron UTM and impact strength on a TMI Impact Tester according to ASTM standards D638 and D256, respectively. For lab-scale experiments, the compounding is carried out in a Brabender Plasticorder batch mixer. The compounded sample is compression molded to <0.4 mm and the in-plane thermal conductivity is measured using a modified laser flash method using a special sample holder and an in-plane mask (Netzsch Instruments).

Figure 6:
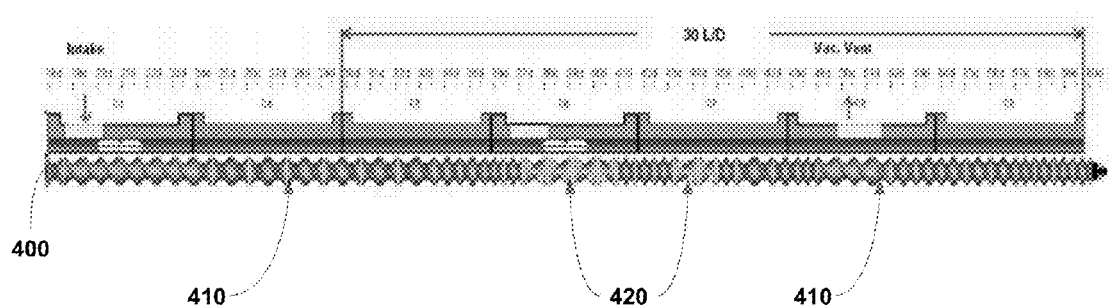
FIG. 6 is a schematic of a conventional extruder screw for processing plastic compositions.

The injected molded dog bone samples are prepared using the extruder screws of FIGS. 2-4 and 6. The screw configurations of FIGS. 2-4 illustrate embodiments of the invention and have been described. The screw configuration 400 of FIG. 6 represents a conventional screw configuration for extruding plastic materials and comprises a plurality of conveying elements 410 and kneading block sections 420 to provide a polymer melt. Samples prepared using the screws of FIGS. 2 and 5 introduce the polymer material and the boron nitride filler at inlet 122. The side feeder used to introduce the fillers into the extruder at 184 in FIGS. 3 and 4 includes a screw comprising shovel elements. In the examples, screw configurations of FIGS. 2-4 are referred to as configurations 1, 2, and 3 respectively, and the screw configuration of FIG. 6 is a comparative screw identified as C1. Comparative examples 1-5 (Comp. 1-5) are prepared using the screw C1. Examples 1-17 are examples illustrating non-limiting embodiments in accordance with aspects and embodiments of the present invention.

Examples 1-3

Thermally conductive polycarbonate compositions comprising boron nitride agglomerates are prepared using the screw configurations and conditions shown in Table 1.

TABLE 1

| Example | Extruder size | Screw Config. | RPM | Target Wt. % | Actual Wt. % | D90 (microns) | Through-plane TC (W/mK) |
|---------|---------------|---------------|-----|--------------|--------------|---------------|-------------------------|
| Comp. 1 | 20 mm | C1 | 500 | 40% | 43.7% | N/A | 0.75 |
| Comp. 2 | 20 mm | C1 | 400 | 50% | 52.6% | N/A | 1.11 |
| Ex. 1   | 20 mm | 2  | 800 | 40% | 41.1% | 138 | 1.01 |
| Ex. 2   | 20 mm | 2  | 800 | 50% | 50.3% | 152 | 1.52 |

TABLE 1-continued

| Example | Extruder size | Screw Config. | RPM | Target Wt. % | Actual Wt. % | D90 (microns) | Through-plane TC (W/mK) |
|---|---|---|---|---|---|---|---|
| Comp. 3 | 40 mm | C1 | 100-450 | 45% | 45.2% | 28 | 0.88 |
| Ex. 3 | 40 mm | 2 | 100-500 | 45% | 44.9% | 50 | 1.08 |

As shown in Table 1, using a screw configuration in accordance with aspects of the present technology resulted in compositions having significantly higher through-plane thermal conductivity than those produced with the conventional screw. As illustrated in Table 1, the through-plane thermal conductivity increased anywhere from about 17% to about 36% using a screw in accordance with aspects of the present technology. The D90 data shows that using an extruder screw in accordance with aspects of the present technology allows for greater retention of agglomerate size, which can contribute to greater through-plane thermal conductivity in the composition.

Examples 4-6

Thermally conductive compositions comprising nylon resins and boron nitride filler materials are prepared according to the compositions illustrated in Table 2.

TABLE 2

| Example | Resin | Screw Config | RPM | Target Wt. % | Actual Wt. % | D90 (microns) | Through-Plane TC (W/mK) |
|---|---|---|---|---|---|---|---|
| Comp. 4 | PA66 | C1 | 100 | 45% | 43.6% | 21 | 1.02 |
| Ex. 4 | PA66 | 2 | 100 | 45% | 42.1% | 38 | 1.33 |
| Comp. 5 | PA6 | C1 | 100 | 45% | 45.6% | 21 | 0.87 |
| Ex. 5 | PA6 | 2 | 150 | 45% | 43.9% | 20 | 1.17 |

As shown in Table 2, using an extruder screw in accordance with aspects of the invention provides compositions with higher through-plane thermal conductivity.

The in-plane thermal conductivity of various composition is also evaluated. Table 3 illustrates the in-plane thermal conductivity, through-plane conductivity, and ratio of in-plane to through-plane conductivity for Comparative Examples 3-5 and Examples 3-5.

TABLE 3

| Example | Screw Config | Through-plane TC (W/mK) | In-plane TC (W/mK) | Ratio (IP:TP) |
|---|---|---|---|---|
| Comp. 4 | C1 | 1.02 | 4.26 | 4.18 |
| Ex. 4 | 2 | 1.33 | 4.29 | 3.23 |
| Comp. 5 | C1 | 0.87 | 4.66 | 5.36 |
| Ex. 5 | 2 | 1.17 | 4.06 | 3.47 |
| Comp. 3 | C1 | 0.88 | 3.88 | 4.41 |
| Ex. 3 | 2 | 1.08 | 3.49 | 3.23 |
| Ex. 6 | 3 | 1.06 | 3.56 | 3.35 |

As shown in Table 3, the compositions formed using an extruder screw in accordance with aspects of the present technology exhibit in-plane thermal conductivities comparable to those made using the conventional extruder screw but have higher through-plane thermal conductivities and a lower ratio of in-plane to through-plane thermal conductivity.

Examples 7-16

Examples 7-16 in Table 4 below are made are compounded into a Nylon 5 resin using a Brabender Plasti-corder Batch Mixer. The compounded samples were compression molded to thin films (about 0.3 mm thick) and the in-plane thermal conductivity was measured using a modified laser flash method using an in-plane sample mask (Netzsch Instruments).

TABLE 4

| Example | BN Grade | BN (wt %) | ZnO (wt %) | MgO (wt %) | GF (wt %) | Silane | Resin | Total filler Volume % | Total filler Weight % | Actual TC (W/mK) |
|---|---|---|---|---|---|---|---|---|---|---|
| Comp. 6 | | 50.0 | — | — | — | — | 50.0% | | | 5.2 |
| Ex. 7 | HCPL | 31.2% | 19.4% | — | 2.3% | 1.6% | 45.5% | 33.0% | 52.9% | 5.0 |
| Ex. 8 | HCPL | 36.8% | 7.8% | — | 8.3% | 1.6% | 45.5% | 33.0% | 52.9% | 4.9 |

TABLE 4-continued

| Example | BN Grade | BN (wt %) | ZnO (wt %) | MgO (wt %) | GF (wt %) | Silane | Resin | Total filler Volume % | Total filler Weight % | Actual TC (W/mK) |
|---|---|---|---|---|---|---|---|---|---|---|
| Ex. 9 | CF600 | 39.0% | 15.3% | — | 0.0% | 1.6% | 44.1% | 32.6% | 54.3% | 5.0 |
| Ex. 10 | CF600 | 31.1% | 19.5% | — | 7.4% | 1.7% | 10.3% | 34.7% | 58.0% | 5.0 |
| Ex. 11 | HCPL | 20.0% | 50.0% | — | — | — | 30.0% | 39.6% | 70.0% | 5.0 |
| Ex. 12 | PT100 | 35.0% | 35.0% | — | — | 2.1% | 27.9% | 44.5% | 70.0% | 6.56 |
| Ex. 12 | HCPL | 25.2% | — | 20.9% | 13.9% | 1.8% | 38.2% | 38.2% | 60.0% | 3.82 |
| Ex. 13 | HCPL | 21.5% | — | 42.6% | — | 1.9% | 34% | 40.0% | 64.1% | 4.50 |
| Ex. 14 | HCPL | 36.6% | — | 19.0% | — | 1.7% | 42.7 | 35.0% | 55.6% | 4.82 |
| Ex. 15 | PT100 | 30.0% | — | — | 20.0% | — | 50.0% | — | — | 3.5 |
| Ex. 16 | PT100 | 20.0% | — | — | 30.0% | — | 50.0% | — | — | 2.3 |

As shown in Table 4, a thermal conductivity of 5.0 W/mK can be achieved with significantly lower BN content. Given that the price of BN is nearly 30 times that of glass fibers or zinc oxide, lowering the BN content from about 50 wt. % to about 31 wt. % represents a nearly 40% reduction in the cost of the thermally conductive composition. The compositions of Examples 7-13 could be produced at a cost that is about 20% to about 55% lower than that of comparative Example 6.

Examples 17-20

Examples 17-20 and illustrate thermally conductive compositions with and without a vinyl silane additive. The plastic compositions are formed from a polycarbonate resin with a boron nitride filler. The composition are compounded using a twin screw extruder using a screw configuration as described in FIG. 3. The boron nitride concentrations and silane additive concentrations are shown in Table 5.

TABLE 5

| Example | BN Grade | Silane | Target Wt. % | Actual Wt. % | In-plane TC (W/mK) | Viscosity at 10 s⁻¹ (Poise) |
|---|---|---|---|---|---|---|
| Ex. 17 | PT100 | — | 40% | 38.5% | 3.26 | 529 |
| Ex. 18 | PT100 | — | 50% | 49.3% | 4.89 | 1120 |
| Ex. 19 | PT100 | 3% A172NT | 45% | 44.2% | 4.76 | 577 |
| Ex. 20 | PT100 | 3% A174NT | 45% | 43.2% | 4.88 | 552 |

The data in Table 5 shows that the silane additives enable thermal conductivity equivalent to 50 wt. % PT100 with only 43 wt. % PT100, representing a 14% reduction in BN loading. The viscosity at 43-44 wt. % is also significantly lower than expected and comparable to 40 wt. % neat PT100.

Examples 21-24

In addition to providing compositions having high thermal conductivities, the present method also provides compositions with excellent mechanical properties. In Examples 21-24, boron nitride is compounded into PA6 resin using the screw illustrated in FIG. 3 with NXT silane loading at 3 weight percent (if indicated) of the filler composition and injected molded as described earlier. Table 6 illustrates various properties of the compositions.

TABLE 6

| Ex. # | BN Grade | BN wt. % | ZnO wt. % | GF wt. % | Silane | In-plane TC (W/mK) | Izod imp. (J/m) | Tens. Str. (psi) | Strain @ break (%) |
|---|---|---|---|---|---|---|---|---|---|
| 21 | CF600 | 41.3 | 0.0 | 0.0 | No | 3.2 | 20.9 | 8747 | 1.4 |
| 22 | HCPL | 45.3 | 0.0 | 0.0 | Yes | 4.0 | 31.2 | 7983 | 1.6 |
| 23 | HCPL | 41.9 | 16.1 | 0.0 | Yes | 4.1 | 23.6 | 8840 | 1.3 |
| 24 | HCPL | 40.0 | 10.0 | 7.5 | Yes | 4.8 | 31.6 | 9713 | 1.1 |

The CF600 and HCPL boron nitride powder grades are similar to one another, and Table 6 illustrates that the addition of the silane and use of the glass fibers can significantly improve the mechanical properties of the composition including, for example, impact strength and tensile strength of the compositions.

Examples 25-26

Examples 25-26 are prepared by adding HCPL boron nitride, zinc oxide, titania, and a silane to a nylon resin and mixing in a Brabender Plasti-corder mixing bowl. Table 7 shows the thermal conductivity data for the resins.

TABLE 7

| Example | BN wt. % | ZnO wt. % | TiO$_2$ wt. % | Total Fillers wt. % | Silane wt. % | Resin | Resin wt. % | In-plane TC (W/m-K) |
|---|---|---|---|---|---|---|---|---|
| 25 | 32.3 | 5.0 | 20.8 | 58.0 | 1.7 | PA6 | 40.3 | 4.3 |
| 26 | 26.3. | 15.4 | 20.4 | 62.0 | 1.9 | PA6 | 36.1 | 3.8 |

Examples 27-35

Examples 1-24 are prepared by separately adding the filler components and silane to the resin composition at the time of mixing or compounding.

Examples 25-33 employ blended filler compositions comprising boron nitride, zinc oxide or titanium dioxide, optionally glass fiber, and a silane. The boron nitride is CF600 boron nitride, except for Examples 26 and 29 where the boron nitride is PT 110. The silane is NXT. The filler composition is prepared by blending the boron nitride, zinc oxide, optional glass fiber, and silane with a V-blender having a liquid dispensing intensifier bar to blend the filler components and the silane. The blended filler is then added to a resin composition and molded. The molded resins of Examples 25-30 are prepared by using a Brabender Plasti-corder Batch Mixer. The compounded samples were compression molded to thin films (about 0.3 mm thick) and the in-plane thermal conductivity was measured using a modified laser flash method using an in-plane sample mask (Netzsch Instruments). Examples 31-33 are compounded using a twin screw extruder employing a screw configuration in accordance with FIG. 3, and then injected molded. Table 8 illustrates properties of the compositions.

TABLE 8

| Example | BN wt. % | ZnO wt. % | Glass Fiber wt. % | Total Fillers wt. % | Silane wt. % | Resin | Resin wt. % | In-plane TC (W/m-K) | Tensile Strength (psi) | Notched Izod Impact (J/m) |
|---|---|---|---|---|---|---|---|---|---|---|
| 25 | 36.8 | 7.8 | 10.4 | 55.0 | 1.7 | PA6 | 43.4 | 4.7 | N/A | N/A |
| 26 | 40.0 | 30.0 | 0 | 70.0 | 3.5 | PA6 | 26.5 | 9.5 | N/A | N/A |
| 27 | 20.0 | 50.0 | 0 | 70.0 | 2.1 | PA6 | 27.9 | 4.7 | N/A | N/A |
| 28 | 36.8 | 7.8 | 10.4 | 55.0 | 1.7 | PC | 43.4 | 5.7 | N/A | N/A |
| 29 | 40.0 | 30.0 | 0 | 70.0 | 3.5 | PC | 26.5 | 11.3 | N/A | N/A |
| 30 | 20.0 | 50.0 | 0 | 70.0 | 2.1 | PC | 27.9 | 3.8 | N/A | N/A |
| 31 | 24.7 | 5.2 | 7.0 | 38.0 | 1.1 | PA6 | 60.9 | 3.6 | 9677 | 33.7 |
| 32 | 29.7 | 22.3 | 0 | 54.6 | 2.6 | PA6 | 41.9 | 3.8 | 6845 | 24.8 |
| 33 | 19.8 | 49.4 | 0 | 71.3 | 2.1 | PA6 | 26.6 | 5.1 | 7579 | 28.0 |

Examples 36-64

A boron nitride filler treated with a silane is added to one of a polycarbonate resin, a nylon resin, or a polypropylene resin and mixed using a Brabender Plasti-corder mixing bowl. The boron nitride is HCPL grade. The boron nitride is loaded at 40 weight percent of the composition, and the silane concentration is varied. Tables 9-11 show the thermal conductivities of the compositions.

TABLE 9

Boron Nitride Loaded In Polycarbonate

| Example | BN wt. % | Silane wt. % | Silane | Silane Chemistry | Resin wt. % | TC (W/mK) |
|---|---|---|---|---|---|---|
| Comp. 7 | 40 | — | — | — | 60 | 2.40 |
| 36 | 40 | 1.2 | A187 | Epoxy | 58.8 | 2.48 |

TABLE 9-continued

Boron Nitride Loaded In Polycarbonate

| Example | BN wt. % | Silane wt. % | Silane | Silane Chemistry | Resin wt. % | TC (W/mK) |
|---|---|---|---|---|---|---|
| 37 | 40 | 1.2 | A172 NT | Vinyl | 58.8 | 2.79 |
| 38 | 40 | 1.2 | A174 NT | Methacryloxy | 58.8 | 2.87 |
| 39 | 40 | 1.2 | NXT | Thiocarboxylate | 58.8 | 2.91 |

TABLE 10

Boron Nitride Loaded In Nylon 6

| Example | BN wt. % | Silane wt. % | Silane | Silane Chemistry | Resin wt. % | TC (W/mK) |
|---|---|---|---|---|---|---|
| Comp. 8 | 40 | — | — | — | 60 | 3.48 |
| 40 | 40 | 1.2 | NXT | Thiocarboxylate | 58.8 | 3.57 |
| 41 | 40 | 1.2 | TCDDS | Halo | 58.8 | 3.89 |
| 42 | 40 | 1.2 | SIM6475 | Mercapto | 58.8 | 3.72 |
| 43 | 40 | 1.2 | A1100 | Amino | 58.8 | 3.32 |
| 44 | 40 | 1.2 | A187 | Epoxy | 58.8 | 3.19 |
| 45 | 40 | 1.2 | A1120 | Amino | 58.8 | 3.41 |
| 46 | 40 | 1.2 | Alink 25 | Isocyanate | 58.8 | 3.43 |

TABLE 11

Boron Nitride Loaded In Polypropylene

| Example | BN wt. % | Silane wt. % | Silane | Silane Chemistry | Resin wt. % | TC (W/mK) |
|---|---|---|---|---|---|---|
| Comp. 9 | 50 | — | — | — | 50 | 3.56 |
| Comp. 10 | 50 | — | — | — | 50 | 3.62 |
| Comp. 11 | 50 | — | — | — | 50 | 3.48 |
| 47 | 50 | 1.5 | A172 NT | Vinyl | 48.5 | 3.76 |
| 48 | 50 | 1.0 | A172 NT | Vinyl | 49.0 | 3.87 |
| 49 | 50 | 0.5 | A172 NT | Vinyl | 49.5 | 3.86 |
| 50 | 50 | 1.2 | A172 NT | Vinyl | 48.8 | 4.39 |
| 51 | 50 | 1.5 | A137 | Alkyl | 48.5 | 3.57 |
| 52 | 50 | 1.0 | A137 | Alkyl | 49.0 | 3.97 |
| 53 | 50 | 0.5 | A137 | Alkyl | 49.5 | 3.80 |
| 54 | 50 | 1.1 | A137 | Alkyl | 48.9 | 3.75 |

TABLE 11-continued

Boron Nitride Loaded In Polypropylene

| Example | BN wt. % | Silane wt. % | Silane | Silane Chemistry | Resin wt. % | TC (W/mK) |
|---------|----------|--------------|--------|------------------|-------------|-----------|
| 55 | 50 | 1.5 | A-171 | Vinyl | 48.5 | 3.31 |
| 56 | 50 | 1.0 | A-171 | Vinyl | 49.0 | 3.98 |
| 57 | 50 | 0.8 | A-171 | Vinyl | 49.4 | 3.78 |
| 58 | 50 | 0.5 | A-171 | Vinyl | 49.5 | 3.48 |
| 59 | 50 | 1.5 | A-151 | Vinyl | 48.5 | 3.42 |
| 60 | 50 | 1.0 | A-151 | Vinyl | 49.0 | 4.07 |
| 61 | 50 | 0.8 | A-151 | Vinyl | 49.2 | 3.86 |
| 62 | 50 | 0.5 | A-151 | Vinyl | 49.5 | 3.76 |
| 63 | 50 | 1.5 | NXT | Thiocarboxylate | 48.5 | 4.17 |
| 64 | 50 | 1.0 | NXT | Thiocarboxylate | 49.0 | 4.25 |

Examples 65-70

Blended filler compositions are prepared with boron nitride, zinc oxide, an optional glass fiber, and a silane. The silane is NXT. The blended fillers are prepared and introduced into a Nylon 6 resin. The fillers introduced into the resins are either introduced with or without prior heat treatment of the blended filler. Filler compositions that are heat treated prior to introduction into the resin are heat treated at 50° C. for 72 hours in a convection oven. Table 12 shows the thermal conductivities of the compositions. The compositions in Table 12 are compounded with a Brabender Plasti-corder.

TABLE 12

| Example | BN Grade | BN wt. % | ZnO wt. % | Glass Fiber wt. % | Silane | Filler Heat Treated | Resin wt. % | TC (W/mK) |
|---------|----------|----------|-----------|-------------------|--------|--------------------|-----|-----|
| 65 | CF600 | 36.8 | 7.8 | 10.4 | 1.7 | No | 43.4 | 4.7 |
| 66 | CF600 | 36.8 | 7.8 | 10.4 | 1.7 | Yes | 43.4 | 4.9 |
| 67 | CF600 | 20 | 50 | — | 2.1 | No | 27.9 | 4.7 |
| 68 | CF600 | 20 | 50 | — | 2.1 | Yes | 27.9 | 5.4 |
| 69 | PT110 | 40 | 30 | — | 3.5 | No | 26.5 | 9.5 |
| 70 | PT110 | 40 | 30 | — | 3.5 | Yes | 26.5 | 11.2 |

As illustrated in the table, heat treating the blended filler composition prior to use can improve the thermal conductivity of the resin composition.

Embodiments of the invention have been described above and, obviously, modifications and alterations will occur to others upon the reading and understanding of this specification. The invention and any claims are intended to include all modifications and alterations insofar as they come within the scope of the claims or the equivalent thereof.

What is claimed is:

1. A filler composition comprising a blend of:
a boron nitride;
a metal oxide; and
a silane, wherein the silane is chosen from a thiocarboxylate silane, a blocked mercapto silane, or a combination thereof.

2. The filler composition of claim 1, wherein the boron nitride is present in an amount of from about 5 weight percent to about 98 weight percent; the metal oxide is present in an amount of from about 5 weight percent to about 80 weight percent; and the silane is present in an amount of from about 0.1 weight percent to about 6 weight percent.

3. The filler composition of claim 1 wherein the boron nitride is present in an amount of from about 30 weight percent to about 55 weight percent; the metal oxide in is present an amount of from about 20 weight percent to about 50 weight percent; and the silane is present in an amount of from about 1 weight percent to about 3.5 weight percent.

4. The filler composition of claim 1, wherein the boron nitride is chosen from boron nitride particles, boron nitride agglomerates, or a mixture thereof.

5. The filler composition of claim 1, wherein the boron nitride comprises platelets having a particle size of 0.3 microns to about 200 microns.

6. The filler composition of claim 1, wherein the boron nitride comprises boron nitride agglomerates having a mean particle size of from about 5 microns to about 500 microns.

7. The filler composition of claim 1, wherein the metal oxide is chosen from zinc oxide, aluminum oxide, aluminum nitride, magnesium oxide, beryllium oxide, titanium dioxide, zirconium oxide, yttrium oxide, hafnium oxide, or a combination of two or more thereof.

8. The filler composition of claim 1, wherein the silane further comprises a silane chosen from an alkacryloxy silane, a vinyl silane, a halo silane, a mercapto silane, or a combination of two or more thereof.

9. The filler composition of claim 8, wherein the silane is chosen from 3-octanoylthio-1-propyltriethoxy silane; vinyl tris(2-methoxy-ethoxy)silane; gamma-methacryloxypropyl-treimethoxy silane; trichlorododecyl silane, or a combination of two or more thereof.

10. The filler composition of claim 1 further comprising an additional filler component chosen from glass fibers, glass flake, clays, exfoliated clays, calcium carbonate, talc, mica, wollastonite, clays, exfoliated clays, alumina, aluminum nitride, graphite, metallic powders or flakes of aluminum, copper, bronze, or brass, or a combination of two or more thereof, fibers or whiskers of carbon, graphite, aluminum, copper, bronze, brass, silicon carbide, silicon nitride, aluminum nitride, alumina, zinc oxide, or a combination of two or more thereof, carbon nanotubes, graphene, boron nitride nanotubes, boron nitride nanosheets, zinc oxide nanotubes, or a combination of two or more thereof.

11. The filler composition of claim 1 further comprising glass fiber or glass flake in an amount of from about 2 weight percent to about 30 weight percent.

12. The filler composition of claim 1, wherein the silane is condensed on the surface of blend of the boron nitride and the metal oxide.

13. The filler composition of claim 1, wherein the filler has a color on the L*, a*, b* scale with L* greater than 90, a* of −1.3 to 1.3, and b* of −2.5 to 2.5.

14. A thermally conductive composition comprising:
a resin material; and
a thermally conductive filler composition dispersed in the polymer material, wherein the thermally conductive filler composition comprises a blend of a boron nitride, a metal oxide, and a silane, wherein the silane is chosen from a thiocarboxylate silane, a blocked mercapto silane, or a combination thereof, and the thermally conductive composition has an in-plane thermal conductivity of about 2 W/mK or greater, a through-plane thermal conductivity of about 0.9 W/mK or greater, or both.

15. The composition of claim 14 having an in-plane thermal conductivity of 3.5 W/mK or greater.

16. The composition of claim 14 having an in-plane thermal conductivity of 5 W/mK or greater.

17. The composition of claim 14 comprising a total thermally conductive filler concentration of about 58% by weight or less of the total weight of the composition.

18. The composition of claim 14 having a total thermally conductive filler content of about 40% or less by volume (v/v) of the composition.

19. The composition of claim 14, comprising a boron nitride concentration of about 41 wt. % or less of the composition.

20. The composition of claim 14, comprising a boron nitride concentration of about 20 wt. % to about 60 wt. % of the composition.

21. The composition of claim 14, wherein in the thermally conductive filler composition, the boron nitride is present in an amount of from about 5 weight percent to about 75 weight percent; the metal oxide is present in an amount of from about 5 weight percent to about 80 weight percent; and the silane is present in an amount of from about 0.1 weight percent to about 6 weight percent.

22. The composition of claim 14, wherein the boron nitride is chosen from boron nitride particles, boron nitride agglomerates, or a mixture thereof.

23. The composition of claim 14, wherein the metal oxide is chosen from zinc oxide, magnesium oxide, beryllium oxide, titanium dioxide, zirconium oxide, yttrium oxide, hafnium oxide, or a combination of two or more thereof.

24. The composition of claim 14, wherein the silane further comprises a second silane chosen from an alkacryloxy silane, a vinyl silane, a halo silane, a mercapto silane, or a combination of two or more thereof.

25. The composition of claim 24, wherein the silane is chosen from 3-octanoylthio-1-propyltriethoxy silane; vinyl tris(2-methoxy-ethoxy)silane; gamma-methacryloxypropyltreimethoxy silane; trichlorododecyl silane, or a combination of two or more thereof.

26. The composition of claim 14, wherein the thermally conductive filler composition further comprises an additional filler component chosen from glass fibers, glass flake, clays, exfoliated clays, calcium carbonate, talc, mica, wollastonite, clays, exfoliated clays, alumina, aluminum nitride, graphite, metallic powders or flakes of aluminum, copper, bronze, or brass, or a combination of two or more thereof, fibers or whiskers of carbon, graphite, aluminum, copper, bronze, brass, silicon carbide, silicon nitride, aluminum nitride, alumina, zinc oxide, or a combination of two or more thereof, carbon nanotubes, graphene, boron nitride nanotubes, boron nitride nanosheets, zinc oxide nanotubes, or a combination of two or more thereof.

27. The filler composition of claim 14, wherein the thermally conductive filler composition further comprises glass fiber or glass flake in an amount of from about 0 weight percent to about 60 weight percent.

28. The composition of claim 14, wherein the in-plane thermal conductivity is at least 10 W/mK.

29. The composition of claim 14 having a notched Izod impact value of 20 J/m or greater.

30. The composition of claim 14 having a tensile strength value of about 6500 psi or greater.

31. A shaped article formed by the composition of claim 14.

32. A thermal management assembly comprising the shaped article of claim 29.

33. A filler composition comprising a blend of:
from about 5 weight percent to about 98 weight percent of a boron nitride;
from about 5 weight percent to about 80 weight percent of a metal oxide;
from about 0.1 weight percent to about 60 weight percent of glass fiber, glass flake, or a combination thereof;
and from about 0.1 weight percent to about 6 weight percent or a silane, wherein the silane is chosen from a thiocarboxylate silane, a blocked mercapto silane, or a combination thereof.

34. The filler composition of claim 33, wherein
the boron nitride is chosen from boron nitride particles, boron nitride agglomerates, or a combination thereof;
the metal oxide is chosen from zinc oxide, magnesium oxide, beryllium oxide, titanium dioxide, zirconium oxide, yttrium oxide, aluminum oxide, hafnium oxide, or a combination of two or more thereof; and
the silane comprises a second silane chosen from an alkacryloxy silane, a vinyl silane, a halo silane, a mercapto silane, or a combination of two or more thereof.

35. The composition of claim 34, wherein the silane is chosen from 3-octanoylthio-1-propyltriethoxy silane; vinyl tris(2-methoxy-ethoxy)silane; gamma-methacryloxypropyltreimethoxy silane; trichlorododecyl silane, or a combination of two or more thereof.

36. The filler composition of claim 33, wherein the boron nitride is present in an amount of from about 30 weight percent to about 55 weight percent; the metal oxide in is present an amount of from about 20 weight percent to about 50 weight percent; the silane is present in an amount of from about 1 weight percent to about 3.5 weight percent; and the glass fiber and/or glass flake is present in an amount of from about 1 weight percent to about 10 weight percent.

37. The filler composition of claim 33, wherein the silane is condensed onto the blend of the boron nitride and the metal oxide.

38. A thermally conductive composition comprising (a) a resin material; and (b) the filler composition of claim 33.

39. A filler composition comprising a blend of a boron nitride and a silane, wherein the silane is chosen from a thiocarboxylate silane, a blocked mercapto silane, or a combination thereof.

40. The filler composition of claim 39, wherein the silane further comprises a silane chosen from alkacryloxy second silane, a vinyl silane, a halo silane, a mercapto silane, or a combination of two or more thereof.

41. The filler composition of claim 40, wherein the second silane is chosen from 3-octanoylthio-1-propyltriethoxy silane; vinyl tris(2-methoxy-ethoxy)silane; gamma-methacryloxypropyltreimethoxy silane; trichlorododecyl silane, or a combination of two or more thereof.

42. The filler composition of claim 39 comprising the silane in an amount of from about 0.1 weight percent to about 6 weight percent of the total filler weight.

43. The filler composition of claim 39, wherein the boron nitride is chosen from boron nitride particles, boron nitride agglomerates, or a combination thereof.

44. The filler composition of claim 39, wherein the boron nitride comprises platelets having a particle size of about 0.3 microns to about 200 microns.

45. The filler composition of claim 39, wherein the boron nitride comprises boron nitride agglomerates having a mean particle size of from about 5 microns to about 500 microns.

46. A thermally conductive composition comprising the filler composition of claim 36.

47. A method of making a blended filler composition comprising blending boron nitride with a silane, wherein the silane is chosen from a thiocarboxylate silane, a blocked mercapto silane, or a combination thereof, and heat treating the blend.

48. The method of claim 47 comprising heating at a temperature of at least about 50° C.

49. The method of claim 47, wherein the one or more filler materials comprises a boron nitride and a metal oxide.

50. The method of claim 47, wherein the silane further comprises a silane chosen from an alkacryloxy silane, a vinyl silane, a halo silane, a mercapto silane, or a combination of two or more thereof.

51. The method of claim 50, wherein the silane is chosen from 3-octanoylthio-1-propyltriethoxy silane; vinyl tris(2-methoxy-ethoxy)silane; gamma-methacryloxypropyl-treimethoxy silane; trichlorododecyl silane, or a combination of two or more thereof.

52. The composition of claim 14 with a dielectric strength of at least 250 V/mil.

53. The composition of claim 14 with a volume resistivity of at least $10^{12}$ Ohm-cm.

54. The composition of claim 14 with a density less than 1.7 g/cc.

55. A thermally conductive composition comprising:
a polycarbonate resin material; and
a thermally conductive filler composition dispersed in the polymer material, wherein the thermally conductive filler composition comprises a blend of a boron nitride and a silane, wherein the silane is chosen from a thiocarboxylate silane, a blocked mercapto silane, methacryloxy silane or a combination thereof, and the thermally conductive composition has an in-plane thermal conductivity of about 2 W/mK or greater, a through-plane thermal conductivity of about 0.9 W/mK or greater, or both.

56. The composition of claim 55 where the filler further comprises a metal oxide.

57. A thermally conductive composition comprising:
a polyamide resin material; and
a thermally conductive filler composition dispersed in the polymer material, wherein the thermally conductive filler composition comprises a blend of a boron nitride and a silane, wherein the silane is chosen from a thiocarboxylate silane, a blocked mercapto silane, halosilane or a combination thereof, and the thermally conductive composition has an in-plane thermal conductivity of about 2 W/mK or greater, a through-plane thermal conductivity of about 0.9 W/mK or greater, or both.

58. The composition of claim 56 where the filler further comprises a metal oxide.

* * * * *